(12) United States Patent
Tsukagoshi

(10) Patent No.: US 10,027,856 B2
(45) Date of Patent: *Jul. 17, 2018

(54) DEVICES AND METHODS FOR TRANSMITTING TRANSMISSION VIDEO DATA

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/546,525

(22) PCT Filed: Mar. 3, 2016

(86) PCT No.: PCT/JP2016/056525
§ 371 (c)(1),
(2) Date: Jul. 26, 2017

(87) PCT Pub. No.: WO2016/140293
PCT Pub. Date: Sep. 9, 2016

(65) Prior Publication Data
US 2018/0020128 A1 Jan. 18, 2018

(30) Foreign Application Priority Data
Mar. 5, 2015 (JP) .................... 2015-044108

(51) Int. Cl.
*H04N 5/202* (2006.01)
*H04N 21/485* (2011.01)
*H04N 19/90* (2014.01)

(52) U.S. Cl.
CPC ............. *H04N 5/202* (2013.01); *H04N 19/90* (2014.11); *H04N 21/4854* (2013.01)

(58) Field of Classification Search
CPC .................. G06T 2207/20208; H04N 13/0029
(Continued)

(56) References Cited

U.S. PATENT DOCUMENTS 8,248,492 B2 * 8/2012 Mitsunaga ............... G06T 5/40
348/252
2008/0095408 A1 * 4/2008 Yokohata ............... H04N 5/144
382/106

(Continued)

FOREIGN PATENT DOCUMENTS

JP 2014-534719 A 12/2014
JP 2015-8361 A 1/2015

OTHER PUBLICATIONS

International Search Report dated May 10, 2016 in PCT/JP2016/056525 filed Mar. 3, 2016.

(Continued)

*Primary Examiner* — Paulos M Natnael
(74) *Attorney, Agent, or Firm* — Oblon, McClelland, Maier & Neustadt, L.L.P.

(57) ABSTRACT

To enable a receiving side to appropriately perform processing of obtaining display image data from transmission video data having a predetermined photoelectric conversion characteristic. Input video data is processing and transmission video data having a predetermined photoelectric conversion characteristic is obtained. Encoding processing is applied to the transmission video data and a video stream is obtained. A container of a predetermined format, including the video stream, is transmitted. Information indicating a photoelectric conversion of the input video data is inserted into the video stream and/or the container.

12 Claims, 17 Drawing Sheets

(58) Field of Classification Search
USPC .......................................... 348/725, 723, 441
See application file for complete search history.

(56) References Cited

U.S. PATENT DOCUMENTS

| | | | |
|---|---|---|---|
| 2009/0066816 A1* | 3/2009 | Wakagi | H04N 5/20 |
| | | | 348/234 |
| 2010/0209078 A1* | 8/2010 | Tanoue | H04N 1/00129 |
| | | | 386/224 |
| 2015/0042890 A1 | 2/2015 | Messmer | |
| 2015/0312591 A1* | 10/2015 | Takahashi | H04N 19/597 |
| | | | 375/240.16 |
| 2016/0323595 A1* | 11/2016 | Sato | H04N 19/70 |
| 2016/0345032 A1* | 11/2016 | Tsukagoshi | H04N 21/84 |

OTHER PUBLICATIONS

Tim Borer, "Non-linear Opto-Electrical Transfer Functions for High Dynamic Range Television" British Broadcasting Corporation, Research & Development White Paper WHP 283, 2014, 23 Pages.

* cited by examiner

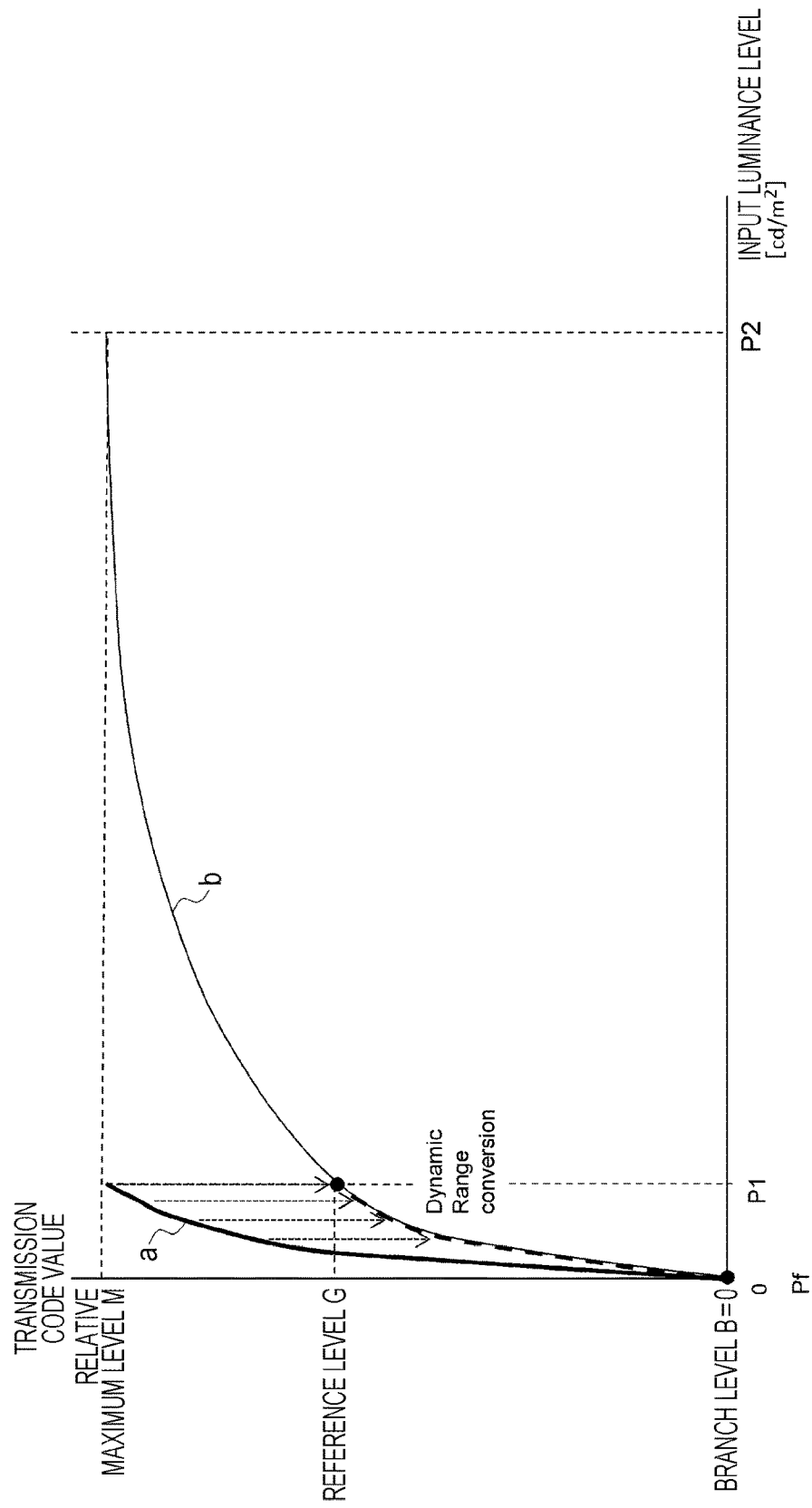

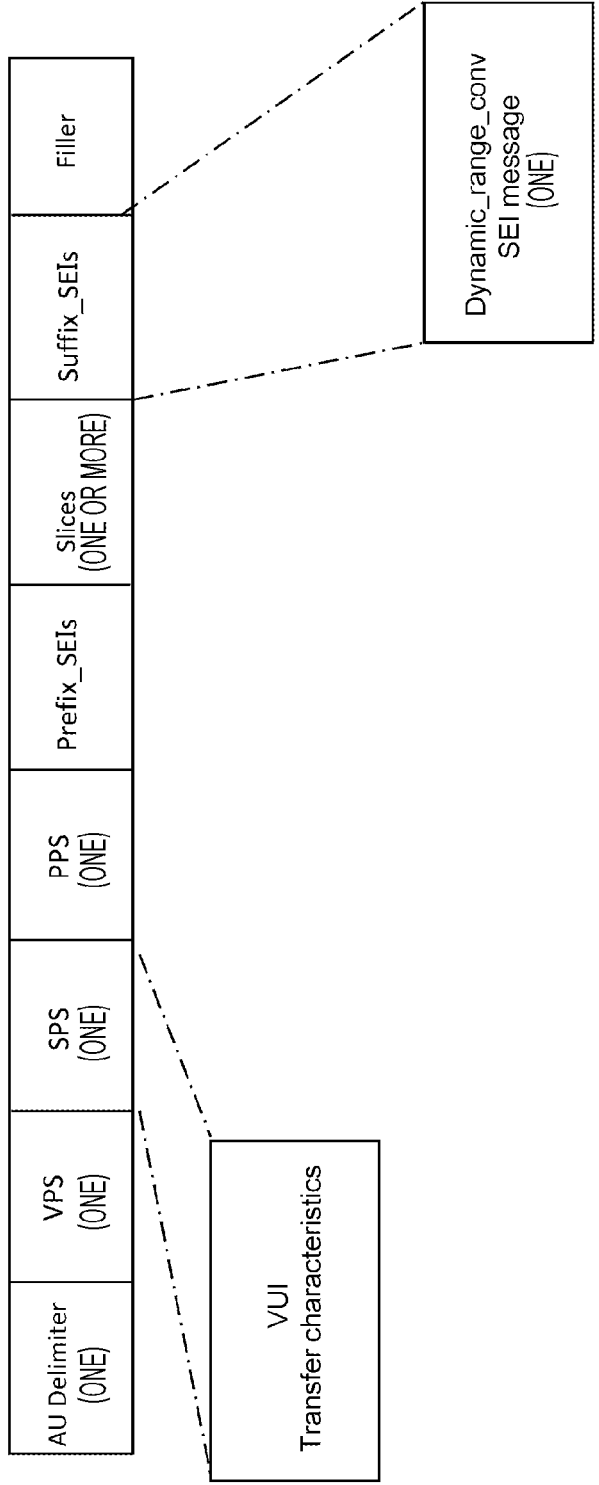

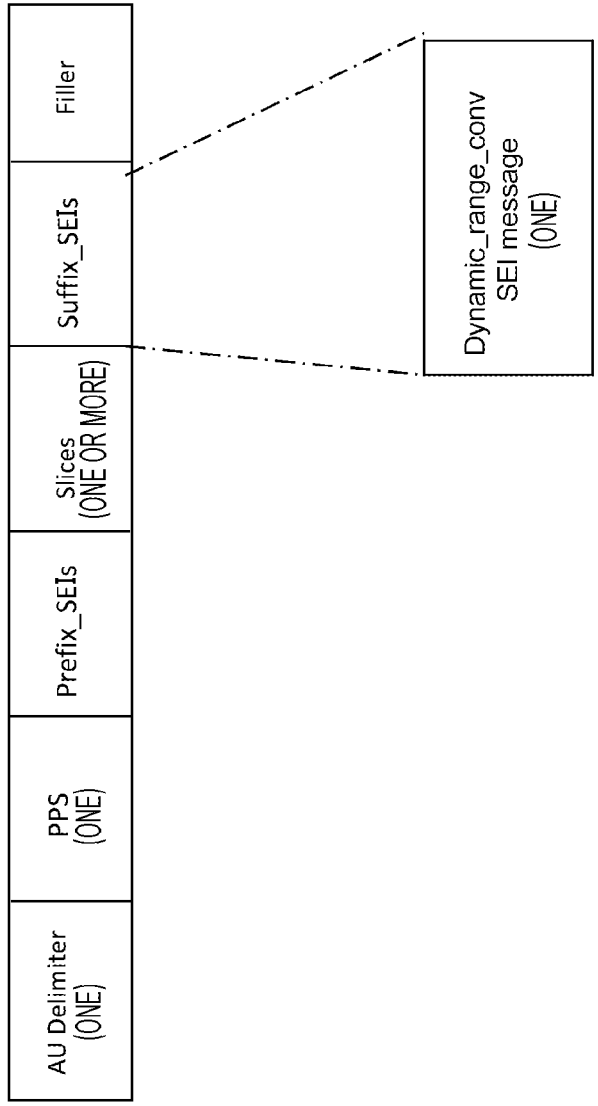

FIG. 7

Dynamic_range_conv SEI syntax

| Syntax | No. of Bits | Format |
|---|---|---|
| Dynamic_range_conv_SEI( ) { | | |
|   Dynamic_range_conv_id | ue(v) | |
|   Dynamic_range_conv_cancel_flag | u(1) | bmlbf |
|   if( !Dynamic_range_conv_cancel_flag ) { | | |
|     coded_bit_depth | 8 | uimsbf |
|     reference_level | 16 | uimsbf |
|     ratio_conversion_flag | 1 | bslbf |
|     conversion_table_flag | 1 | bslbf |
|     reserved | 6 | 0x3f |
|     branch_level | 16 | uimsbf |
|     if( ratio_conversion_flag ) { | | |
|       level_conversion_ratio | 8 | uimsbf |
|     } | | |
|     if (conversion_table_flag) { | | |
|       table_size | 16 | uimsbf |
|       for ( I = 0; I < table_size ; I++ ) { | | |
|         level_R[i] | 16 | uimsbf |
|         level_G[i] | 16 | uimsbf |
|         level_B[i] | 16 | uimsbf |
|       } | | |
|     } | | |
|     original_transferfunction | 8 | bslbf |
|   } | | |
| } | | |

FIG. 8

| semantics | |
|---|---|
| coded_data_bit_depth (8bits) | CODED PIXEL BIT DEPTH |
| reference_level | REFERENCE LUMINANCE LEVEL VALUE |
| ratio_conversion_flag | INDICATING PERFORMING SIMPLE CONVERSION |
| conversion_table_flag | INDICATING BY CONVERSION TABLE |
| Branchlevel | BRANCH LEVEL VALUE |
| level_conversion_ratio | INDICATING RATIO OF LEVEL CONVERSION |
| table_size | INDICATING THE NUMBER OF INPUTS OF CONVERSION TABLE |
| level_R[i] | INDICATING VALUE AFTER CONVERSION OF Red component |
| level_G[i] | INDICATING VALUE AFTER CONVERSION OF Green component |
| level_B[i] | INDICATING VALUE AFTER CONVERSION OF Blue component |
| original_transferfunction | INDICATING TYPE OF ORIGINAL TRANSFER FUNCTION CHARACTERISTICS |
| "1" | BT.709-5 Transfer Function (SDR) |
| "14" | 10bit BT.2020 Transfer Function (SDR) |
| "16" | SMPTE 2084 Transfer Function (HDR1) |
| "25" | HDR (HDR2) |

FIG. 9

New descriptor 'dynamic_range_conversion descriptor' Syntax

| Syntax | No. of Bits | Format |
|---|---|---|
| dynamic_range_conversion descriptor( ) { | | |
|   descriptor_tag | 8 | bslbf |
|   descriptor_length | 8 | bslbf |
|   highdynamicrange | 8 | uimsbf |
|   transferfunction | 8 | uimsbf |
|   xycolourprimaries | 8 | uimsbf |
|   matrixcoefficients | 8 | uimsbf |
|   referencelevel | 8 | uimsbf |
|   branchlevel | 8 | uimsbf |
|   original_transferfunction | 8 | uimsbf |
|   } | | |
| } | | |

FIG. 10

| semantics | | |
|---|---|---|
| highdynamicrange | | |
| | "1" | CURRENT STREAM IS HDR |
| | "0" | CURRENT STREAM IS SDR |
| transferfunction | | |
| | "1" | BT.709-5 Transfer Function (SDR) |
| | "14" | 10bit BT.2020 Transfer Function (SDR) |
| | "16" | SMPTE 2084 Transfer Function (HDR1) |
| | "25" | HDR (HDR2) |
| xycolourprimaries | | |
| | "1" | BT.709-5 |
| | "9" | BT.2020 |
| | "10" | SMPTE 428 or XYZ |
| matrixcoefficients | | |
| | "1" | BT.709-5 |
| | "9" | BT.2020 non-constant luminance |
| | "11" | SMPTE 2085 or $Y'D'_zD'_x$ |
| referencelevel | 0 TO 100 | VALUE OBTAINED BY SPECIFYING VALUE OF 0 TO 100 IN RELATIVE RANGE NORMALIZED TO MAXIMUM OF 1 AND DIVIDING SPECIFIED VALUE BY 100 IS RECOGNIZED AS REFERENCE LEVEL. |
| branchlevel | 0 TO 100 | VALUE OBTAINED BY SPECIFYING VALUE OF 0 TO 100 IN RELATIVE RANGE NORMALIZED TO MAXIMUM OF 1 AND DIVIDING SPECIFIED VALUE BY 100 IS RECOGNIZED AS RELATIVE BRANCH LEVEL. |
| original_transferfunction | | |
| | "1" | BT.709-5 Transfer Function (SDR) |
| | "14" | 10bit BT.2020 Transfer Function (SDR) |
| | "16" | SMPTE 2084 Transfer Function (HDR1) |
| | "25" | HDR (HDR2) |

TS STRUCTURE

MMT STRUCTURE

DEVICES AND METHODS FOR TRANSMITTING TRANSMISSION VIDEO DATA

TECHNICAL FIELD

The present technology relates to a transmitting device, a transmitting method, a receiving device, and a receiving method, and more specifically relates to a transmitting device that transmits transmission video data having a predetermined photoelectric conversion characteristic, and the like.

BACKGROUND ART

Conventionally, transmission of transmission video data obtained by application of high dynamic range photoelectric conversion to high dynamic range video data has been considered. Hereinafter, the high dynamic range is appropriately written as "HDR". For example, Non-Patent Document 1 has description about an HDR photoelectric conversion characteristic (new gamma characteristic) considering reception with conventional receivers and including a compatible region with a conventional photoelectric conversion characteristic (gamma characteristic).

CITATION LIST

Non Patent Document

Non-Patent Document 1: Tim Borer, "Non-Linear Opto-Electrical Transfer Functions for High Dynamic Range Television", Research & Development White Paper WHP 283, July 2014

SUMMARY OF THE INVENTION

Problems to be Solved by the Invention

An objective of the present technology is to enable a receiving side to appropriately perform processing of obtaining display image data from transmission video data having a predetermined photoelectric conversion characteristic.

Solutions to Problems

A concept of the present technology lies in a transmitting device including:
a photoelectric conversion processing unit configured to process input video data to obtain transmission video data having a predetermined photoelectric conversion characteristic;
an encoding unit configured to apply encoding processing to the transmission video data to obtain a video stream;
a transmitting unit configured to transmit a container of a predetermined format, including the video stream; and
an information insertion unit configured to insert information indicating a state of photoelectric conversion of the input video data into the video stream and/or the container.

In the present technology, the input video data is processed by the photoelectric conversion processing unit, and the transmission video data having a predetermined photoelectric conversion characteristic is obtained. The encoding processing is applied to the transmission video data by the encoding unit, and the video stream is obtained. The container of a predetermined format, including the video stream, is transmitted by the transmitting unit. The information indicating a state of photoelectric conversion of the input video data is inserted into the video stream and/or the container by the information insertion unit.

For example, the information indicating a state of photoelectric conversion of the input video data may be information indicating an electric-photo conversion characteristic corresponding to a conversion characteristic of the photoelectric conversion when the photoelectric conversion is performed for the input video data, and information indicating an electric-photo conversion characteristic corresponding to the predetermined photoelectric conversion characteristic when the photoelectric conversion is not performed for the input video data.

For example, the photoelectric conversion processing unit may obtain first transmission video data having a normal dynamic range photoelectric conversion characteristic, second transmission video data having a high dynamic range photoelectric conversion characteristic, or third transmission video data having a high dynamic range photoelectric conversion characteristic.

The first transmission video data is obtained by performing photoelectric conversion with the normal dynamic range photoelectric conversion characteristic, for normal dynamic range video data as the input video data. The second transmission video data is obtained by performing photoelectric conversion with the high dynamic range photoelectric conversion characteristic, for high dynamic range video data as the input video data.

The third transmission video data is obtained by performing dynamic range conversion on the basis of conversion information for converting a value of conversion data with a normal dynamic range photoelectric conversion characteristic into a value of conversion data with a high dynamic range photoelectric conversion characteristic, for the input video data obtained by performing photoelectric conversion with the normal dynamic range photoelectric conversion characteristic, for normal dynamic range video data. For example, the conversion information may be a conversion coefficient or a conversion table.

For example, when the photoelectric conversion processing unit obtains the third transmission video data, the information insertion unit may further insert the conversion information into the video stream and/or the container. When the conversion information is inserted in this way, a receiving side can perform dynamic range conversion of the transmission video data, using the conversion information and can easily perform processing for displaying a normal dynamic range image.

For example, the information insertion unit may further insert information indicating an electric-photo conversion characteristic corresponding to the predetermined photoelectric conversion characteristic into the video stream and/or the container. In this case, the receiving side becomes able to grasp the electric-photo conversion characteristic corresponding to the predetermined photoelectric conversion characteristic included in the transmission video data. Further, for example, the information insertion unit may further insert a reference level as a reference luminance level or a branch level as a luminance level at which a curve of a normal dynamic range photoelectric conversion characteristic and a curve of a high dynamic range photoelectric conversion characteristic branch from a same orbit and are separated into the video stream and/or the container.

In this way, the present technology transmits the information indicating a state of photoelectric conversion of the input video data in transmitting the transmission video data including the predetermined photoelectric conversion characteristic obtained by processing the input video data. Therefore, the receiving side can appropriately perform processing of obtaining display image data from the transmission video data.

Further, another concept of the present technology lies in a receiving device further including:

a receiving unit configured to receive a container of a predetermined format, including a video stream obtained by encoding transmission video data, the transmission video data being transmission video data having a predetermined photoelectric conversion characteristic obtained by processing input video data at a transmitting side, and information indicating a state of photoelectric conversion of the input video data being inserted into the video stream and/or the container, the receiving device further including:

a decoding unit configured to apply decoding processing to the video stream to obtain the transmission video data;

an information extraction unit configured to extract the information indicating a state of photoelectric conversion of the input video data from the video stream and/or the container; and a processing unit configured to apply electric-photo conversion processing based on the information extracted in the information extraction unit, information of the predetermined photoelectric conversion characteristic, and display capability to the transmission video data obtained in the decoding unit to obtain display image data.

In the present technology, the container of a predetermined format, including a video stream obtained by encoding transmission video data, is received by the receiving unit. Here, the transmission video data is the transmission video data having a predetermined photoelectric conversion characteristic obtained by processing the input video data at a transmitting side. Further, the information indicating a state of photoelectric conversion of the input video data is inserted into the video stream and/or the container.

For example, the transmission video data may be first transmission video data having a normal dynamic range photoelectric conversion characteristic, second transmission video data having a high dynamic range photoelectric conversion characteristic, or third transmission video data having a high dynamic range photoelectric conversion characteristic.

Here, the first transmission video data is obtained by performing photoelectric conversion with the normal dynamic range photoelectric conversion characteristic, for normal dynamic range video data as the input video data. The second transmission video data is obtained by performing photoelectric conversion with the high dynamic range photoelectric conversion characteristic, for high dynamic range video data as the input video data.

The third transmission video data is obtained by performing dynamic range conversion on the basis of conversion information for converting a value of conversion data with a normal dynamic range photoelectric conversion characteristic into a value of conversion data with a high dynamic range photoelectric conversion characteristic, for the input video data obtained by performing photoelectric conversion with the normal dynamic range photoelectric conversion characteristic, for normal dynamic range video data.

The decoding processing is applied to the video stream by the decoding unit, and the transmission video data is obtained. The information indicating a state of photoelectric conversion of the input video data is extracted from the video stream and/or the container by the information extraction unit. Then, the electric-photo conversion processing based on the information extracted by the information extraction unit, information of the predetermined photoelectric conversion characteristic, and the display capability is applied by the processing unit to the transmission video data obtained by the decoding unit, and the display image data is obtained.

For example, when the display capability is a high dynamic range, the processing unit may apply electric-photo conversion with a high dynamic range electric-photo conversion characteristic to the transmission video data after performing dynamic range conversion for the transmission video data to obtain the display image data in a case where the transmission video data is the first transmission video data, and apply electric-photo conversion with a high dynamic range electric-photo conversion characteristic to the transmission video data to obtain the display image data in a case where the transmission video data is the second transmission video data or the third transmission video data.

Further, for example, when the display capability is a normal dynamic range, the processing unit may apply electric-photo conversion with a normal dynamic range electric-photo conversion characteristic to the transmission video data to obtain the display image data in a case where the transmission video data is the first transmission video data, and apply electric-photo conversion with a normal dynamic range electric-photo conversion characteristic to the transmission video data after performing dynamic range conversion for the transmission video data to obtain the display image data in a case where the transmission video data is the second transmission video data or the third transmission video data.

As described above, in the present technology, the electric-photo conversion processing based on the information indicating a state of photoelectric conversion of the input video data, the information of the predetermined photoelectric conversion characteristic, and the display capability is applied to the transmission video data having a predetermined photoelectric conversion characteristic obtained by processing the input video data at the transmitting side, and the display image data is obtained. Therefore, the processing of obtaining display image data from the transmission video data can be appropriately performed.

Effects of the Invention

According to the present technology, a receiving side can appropriately perform processing of obtaining display image data from transmission video data having a predetermined photoelectric conversion characteristic. Note that the effects described in the present specification are merely examples and are not limited, and there may be additive effects.

BRIEF DESCRIPTION OF DRAWINGS

FIG. 4 is a diagram for describing an operation of the dynamic range conversion unit in the service transmitting system.

FIG. 5 is a diagram illustrating an access unit of a head of a GOP in a case where an encoding method is HEVC.

FIG. 6 is a diagram illustrating an access unit of other than the head of the GOP in a case where the encoding method is HEVC.

FIG. 7 is a diagram illustrating a structure example of a dynamic range conversion SEI message.

FIG. 8 is a diagram illustrating content of principal information in a structure example of a dynamic range conversion SEI message.

FIG. 9 is a diagram illustrating a structure example of dynamic range conversion descriptor.

FIG. 10 is a diagram illustrating content of principal information in the structure example of dynamic range conversion descriptor.

MODE FOR CARRYING OUT THE INVENTION

Hereinafter, a form for implementing the invention (hereinafter, referred to as "embodiment") will be described. Note that description will be given in the following order:
1. Embodiment
2. Modification 1. Embodiment

[Configuration Example of Transmitting and Receiving System]

Figure 1:
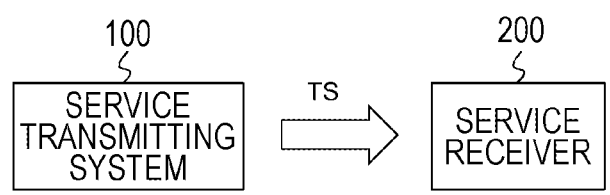
FIG. 1 is a block diagram illustrating a configuration example of a transmitting and receiving system as an embodiment.

FIG. 1 illustrates a configuration example of a transmitting and receiving system 10 as an embodiment. This transmitting and receiving system 10 is configured from a service transmitting system 100 and a service receiver 200. The service transmitting system 100 generates a transport stream TS of MPEG2, as a container, and transmits the transport stream TS on a broadcast wave packet or a network packet.

The service transmitting system 100 processes input video data to obtain transmission video data having a predetermined photoelectric conversion characteristic. The transport stream TS includes a video stream obtained by applying encoding processing to the transmission video data. Information indicating a state of photoelectric conversion of the input video data is inserted into the transport stream TS as the video stream and/or the container.

The service receiver 200 receives the transport stream TS transmitted from the service transmitting system 100. The service receiver 200 applies decoding processing to the video stream included in the transport stream TS to obtain transmission video data. The transmission video data is the transmission video data having a predetermined photoelectric conversion characteristic obtained by performing the processing of the input video data at the transmitting side, as described above.

The service receiver 200 extracts the information indicating a state of photoelectric conversion of the input video data, the information being included in the transport stream TS as the video stream and/or the container. The service receiver 200 then applies electric-photo conversion processing based on the extracted information, information of the predetermined photoelectric conversion characteristic, and display capability to the transmission video data to obtain display image data.

"Configuration Example of Service Transmitting System"

Figure 2:
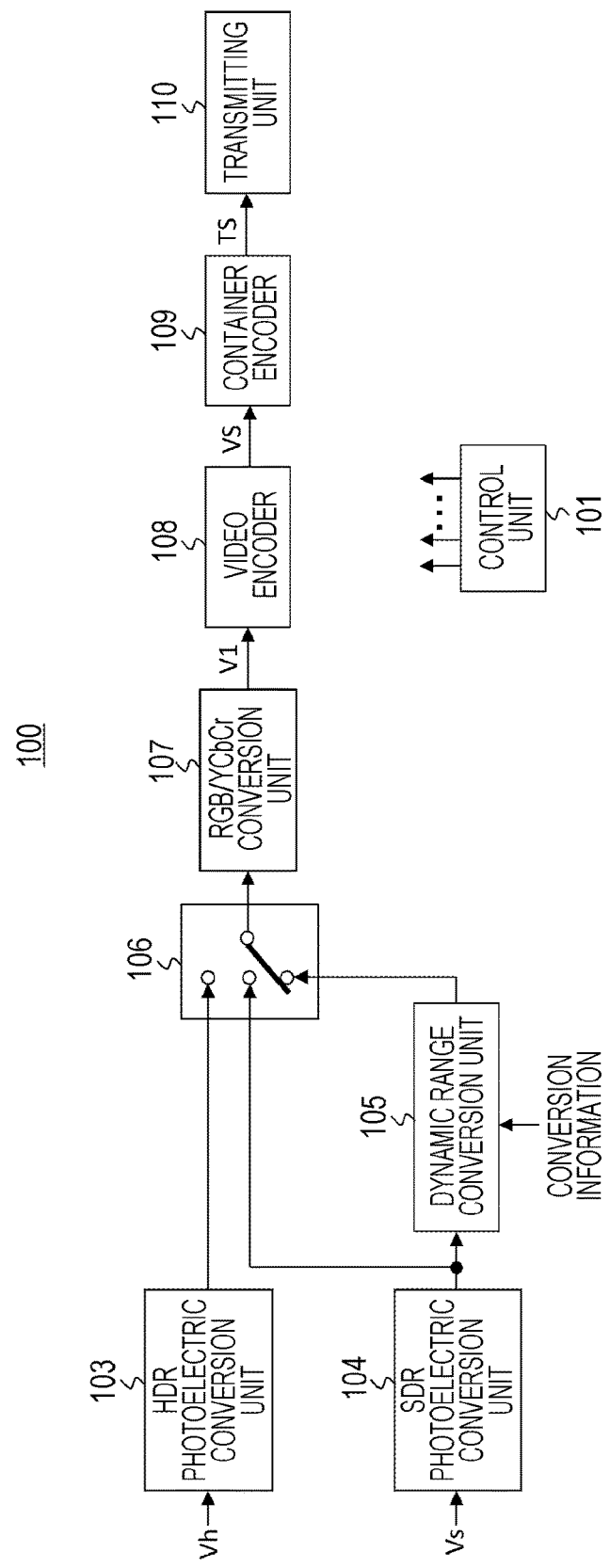
FIG. 2 is a block diagram illustrating a configuration example of a service transmitting system.

FIG. 2 illustrates a configuration example of the service transmitting system 100. The service transmitting system 100 includes a control unit 101, a high dynamic range (HDR) photoelectric conversion unit 103, a standard dynamic range (SDR) (normal dynamic range) photoelectric conversion unit 104, a dynamic range conversion unit 105, a switching switch 106, an RGB/YCbCr conversion unit 107, a video encoder 108, a container encoder 109, and a transmitting unit 110.

The control unit 101 includes a central processing unit (CPU), and controls operations of the respective units of the service transmitting system 100 on the basis of a control program. The HDR photoelectric conversion unit 103 applies an HDR photoelectric conversion characteristic to a high contrast camera output, that is, HDR video data Vh, and performs photoelectric conversion to obtain HDR transmission video data (the transmission video data having the HDR photoelectric conversion characteristic). The HDR transmission video data becomes video material produced by HDR OETF.

The SDR photoelectric conversion unit 104 applies an SDR photoelectric conversion characteristic to a normal contrast camera output, that is, SDR video data Vs, and performs photoelectric conversion to obtain SDR transmission video data (the transmission video data having the SDR photoelectric conversion characteristic). The SDR transmission video data becomes video material produced by SDR OETF.

The dynamic range conversion unit 105 performs dynamic range conversion for the SDR transmission video data to obtain HDR transmission video data (transmission video data having the HDR photoelectric conversion characteristic). That is, the dynamic range conversion unit 105 converts the SDR transmission video data as the video material produced by SDR OETF into the HDR transmission video data. Here, the dynamic range conversion unit 105 performs dynamic range conversion on the basis of conversion information for converting a value of conversion data with the SDR photoelectric conversion characteristic into a value of conversion data with the HDR photoelectric conversion characteristic. The conversion information is provided by the control unit 101, for example.

The dynamic range conversion will be further described with reference to FIG. 3. The solid line a represents an example of an SDR OETF curve illustrating the SDR photoelectric conversion characteristic. The solid line b represents an example of an HDR OETF curve representing the HDR photoelectric conversion characteristic. The horizontal axis represents an input luminance level, P1 represents the input luminance level corresponding to an SDR maximum level, and P2 represents the input luminance level corresponding to an HDR maximum level.

Further, the vertical axis represents a relative value of a transmission code value or a relative value of a normalized encoded level. A relative maximum level M represents the HDR maximum level and the SDR maximum level. A reference level G represents a transmission level of HDR OETF in the input luminance level P1 corresponding to the SDR maximum level, and means so-called a reference white level and indicates use of a range higher than this level for expression of sparkle specific to HDR.

A branch level B represents a level at which the SDR OETF curve and the HDR OETF curve branch from the same orbit and are separated. Pf represents the input luminance level corresponding to the branch level. Note that the branch level B can be an arbitrary value of 0 or more. FIG. 4 illustrates an example in a case where the branch level B is 0.

In the dynamic range conversion in the dynamic range conversion unit 105, input data from the branch level B to the relative maximum level M, of the SDR transmission video data, are converted to have values of conversion data with the HDR photoelectric conversion characteristic. In this case, the relative maximum level M as the SDR maximum level is converted to accord with the reference level G. Note that input data of less than the branch level B are output as output data as they are.

Here, the conversion information is provided as a conversion table or a conversion coefficient. In a case of the conversion table, the dynamic range conversion unit 105 performs conversion by reference to the conversion table. Meanwhile, in a case of the conversion coefficient, the dynamic range conversion unit 105 performs conversion by calculation using the conversion coefficient. For example, the dynamic range conversion unit 105 performs conversion regarding the input data from the branch level B to the relative maximum level M by the following formula (1):

The output data=the branch level $B$+(the input data branch level $B$)*$C$ . . .  (1)

where the conversion coefficient is C.

Referring back to FIG. 2, the switching switch 106 selectively takes out the SDR transmission video data (first transmission video data) obtained in the SDR photoelectric conversion unit 104, the HDR transmission video data (second transmission video data) obtained in the HDR photoelectric conversion unit 103, or the HDR transmission video data (third transmission video data) obtained in the dynamic range conversion unit 105.

The RGB/YCbCr conversion unit 107 converts transmission video data V1 taken out by the switching switch 106 from an RGB domain into a luminance and chrominance (YCbCr) domain. In this case, the RGB/YCbCr conversion unit 107 performs conversion using a conversion method corresponding to a color space on the basis of color space information. Note that the domain of the color space is not limited to the RGB domain, and the luminance and chrominance domain is not limited to YCbCr.

The video encoder 108 applies encoding such as MPEG4-AVC or HEVC to the transmission video data V1, which has been converted into the YCbCr domain in the RGB/YCbCr conversion unit 107, to obtain encoded video data, and generates a video stream (video elementary stream) VS including the encoded video data.

At this time, the video encoder 108 inserts meta-information such as information indicating whether the stream is an SDR stream or an HDR stream and information (a transfer function) indicating an electric-photo conversion characteristic corresponding to a photoelectric conversion characteristic included in the transmission video data V1 into an area of video usability information (VUI) of an SPS NAL unit of an access unit (AU).

Here, the photoelectric conversion characteristic included in the transmission video data V1 is the photoelectric conversion characteristic in the SDR photoelectric conversion unit 104 when the transmission video data V1 is the SDR transmission video data (first transmission video data) obtained in the SDR photoelectric conversion unit 104. Further, the photoelectric conversion characteristic included in the transmission video data V1 is the photoelectric conversion characteristic in the HDR photoelectric conversion unit 103 when the transmission video data V1 is the HDR transmission video data (second transmission video data) obtained in the HDR photoelectric conversion unit 104. Further, the photoelectric conversion characteristic included in the transmission video data V1 is the photoelectric conversion characteristic in the HDR photoelectric conversion unit 103 when the transmission video data V1 is the HDR transmission video data (third transmission video data) obtained in the dynamic range conversion unit 105.

Further, the video encoder 108 inserts a newly defined dynamic range conversion SEI message (Dynamic_range_conv SEI message) having meta-information such as the information indicating a state of photoelectric conversion of the input video data, and conversion information of the dynamic range conversion into a portion of "SEIs" of the access unit (AU). Here, the information indicating a state of photoelectric conversion of the input video data is information indicating an electric-photo conversion characteristic corresponding to the conversion characteristic of the photoelectric conversion when the photoelectric conversion is performed for the input video data, and is information indicating an electric-photo conversion characteristic corresponding to the predetermined photoelectric conversion characteristic included in the transmission video data when the photoelectric conversion is not performed for the input video data.

Here, when the transmission video data V1 is the SDR transmission video data (first transmission video data) obtained in the SDR photoelectric conversion unit 104, the information indicating a state of photoelectric conversion of the input video data is information indicating an electric-photo conversion characteristic corresponding to the photoelectric conversion characteristic in the SDR photoelectric conversion unit 104. Further, when the transmission video data V1 is the HDR transmission video data (second transmission video data) obtained in the HDR photoelectric conversion unit 104, the information indicating a state of photoelectric conversion of the input video data is information indicating an electric-photo conversion characteristic corresponding to the photoelectric conversion characteristic in the HDR photoelectric conversion unit 103. Further, when the transmission video data V1 is the HDR transmission video data (third transmission video data) obtained in the dynamic range conversion unit 105, the information indicating a state of photoelectric conversion of the input video data is information indicating an electric-photo conversion characteristic corresponding to the photoelectric conversion characteristic in the SDR photoelectric conversion unit 104.

FIG. 5 illustrates an access unit of a head of a group of pictures (GOP) in a case where an encoding method is HEVC. Further, FIG. 6 illustrates an access unit of other than the head of the GOP in a case where the encoding method is HEVC. In a case of the encoding method of HEVC, an SEI message group "Prefix_SEIs" for decoding is arranged before slices with encoded pixel data, and a SEI message group "Suffix_SEIs" for display is arranged after the slices. A dynamic range conversion SEI message is arranged as the SEI message group "Suffix_SEIs" or "Prefix_SEIs", for example, as illustrated in FIGS. 5 and 6.

FIG. 7 illustrates a structure example (syntax) of the dynamic range conversion SEI message. FIG. 8 illustrates content (semantics) of principal information in the structure example. One-bit flag information of "Dynamic_range_conv_cancel_flag" indicates whether refreshing "Dynamic_range_conv" message. "0" indicates refreshing "Dynamic_range_conv" message. "1" indicates not refreshing "Dynamic_range_conv" message, that is, maintaining the previous message as it is.

When "Dynamic_range_conv_cancel_flag" is "0", following fields exist. An 8-bit field of "coded_data_bit_depth" indicates an encoded pixel bit depth (a bit depth of the transmission code value). A 16-bit field of "reference_level" indicates a reference luminance level value, that is, the reference level G (see FIG. 3). One-bit flag information of "ratio_conversion_flag" indicates by simple conversion, that is, existence of the conversion coefficient. One-bit flag information of "conversion_table_flag" indicates by the conversion table, that is, existence of conversion table information. A 16-bit field of "branch_level" indicates the branch level B (see FIG. 3).

When "ratio_conversion_flag" is "1", an 8-bit field of "level_conversion_ratio" exists. This field indicates a conversion coefficient (level conversion ratio). When "conversion_table_flag" is"1", a 16-bit field of "table_size" exists. This field indicates the number of inputs of the conversion table. Sixteen-bit fields of "level_R[i]", "level_G[i]", and "level_B[i]" exist by the number corresponding to the encoded pixel bit depth. The field of "level_R[i]" indicates a value of a red component (Red component) after conversion. The field of "level_G[i]" indicates a value of a green component (Red component) after conversion. The field of "level_B[i]" indicates a value of a blue component (Red component) after conversion.

An 8-bit field of "original_transferfunction" indicates a state of the photoelectric conversion of the input video data (a type of original transmission function characteristic). "1" indicates "BT.709-5 Transfer Function (SDR)". "14" indicates "10 bit BT.2020 Transfer Function (SDR)". "16" indicates "SMPTE 2084 Transfer Function (HDR1)". "25" indicates "HDR (HDR2)".

Referring back to FIG. 2, the container encoder 109 generates the transport stream TS including a video stream VS generated in the video encoder 108. The transmitting unit 110 transmits the transport stream TS on a broadcast wave packet or a network packet to the service receiver 200.

At this time, the container encoder 109 inserts, into the transport stream TS as a container, the information indicating whether the stream is an SDR stream or an HDR stream, the information indicating an electric-photo conversion characteristic corresponding to the photoelectric conversion characteristic included in the transmission video data V1, the information indicating a state of the photoelectric conversion of the input video data (a type of original transmission function characteristic), and the like. In the present embodiment, the container encoder 109 inserts dynamic range conversion descriptor (dynamic_range_conversion_descriptor) into under arrangement of a program map table (PMT) or under arrangement of an event information table (EIT).

FIG. 9 illustrates a structure example (syntax) of the dynamic range conversion descriptor. FIG. 10 illustrates content (semantics) of principal information in the structure example. An 8-bit field of "descriptor_tag" indicates a descriptor type, and here indicates the dynamic range conversion descriptor. An 8-bit field of "descriptor_length" indicates the length (size) of the descriptor, and indicates a subsequent byte length as the length of the descriptor.

An 8-bit field of "highdynamicrange" indicates whether the current stream is an HDR stream or an SDR stream. "1" indicates the HDR stream and "0" indicates the SDR stream. An 8-bit field of "transferfunction" indicates an electric-photo conversion characteristic (EOTF characteristic). That is, this field indicates the electric-photo conversion characteristic corresponding to the photoelectric conversion characteristic included in the transmission video data V1. For example, "1" indicates "BT.709-5 Transfer Function (SDR)", "14" indicates "10 bit BT.2020 Transfer Function (SDR)", "16" indicates "SMPTE 2084 Transfer Function (HDR1)", "25" indicates "HDR (HDR2)". Note that "HDR (HDR2)" indicates an HDR electric-photo conversion characteristic. However, "HDR (HDR2)" is not a PQ curve and is referred to as so-called hybrid gamma.

An 8-bit field of "xycolourprimaries" indicates a color space. For example, "1" indicates "BT.709-5", "9" indicates "BT.2020", and "10" indicates "SMPTE 428 or XYZ". An 8-bit field of "matrixcoefficients" indicates a color matrix coefficient. For example, "1" indicates "BT.709-5", "9" indicates "BT.2020 non-constant lumiinance", and "11" indicates "SMPTE 2085 or Y'D'zD'x".

Figure 3:
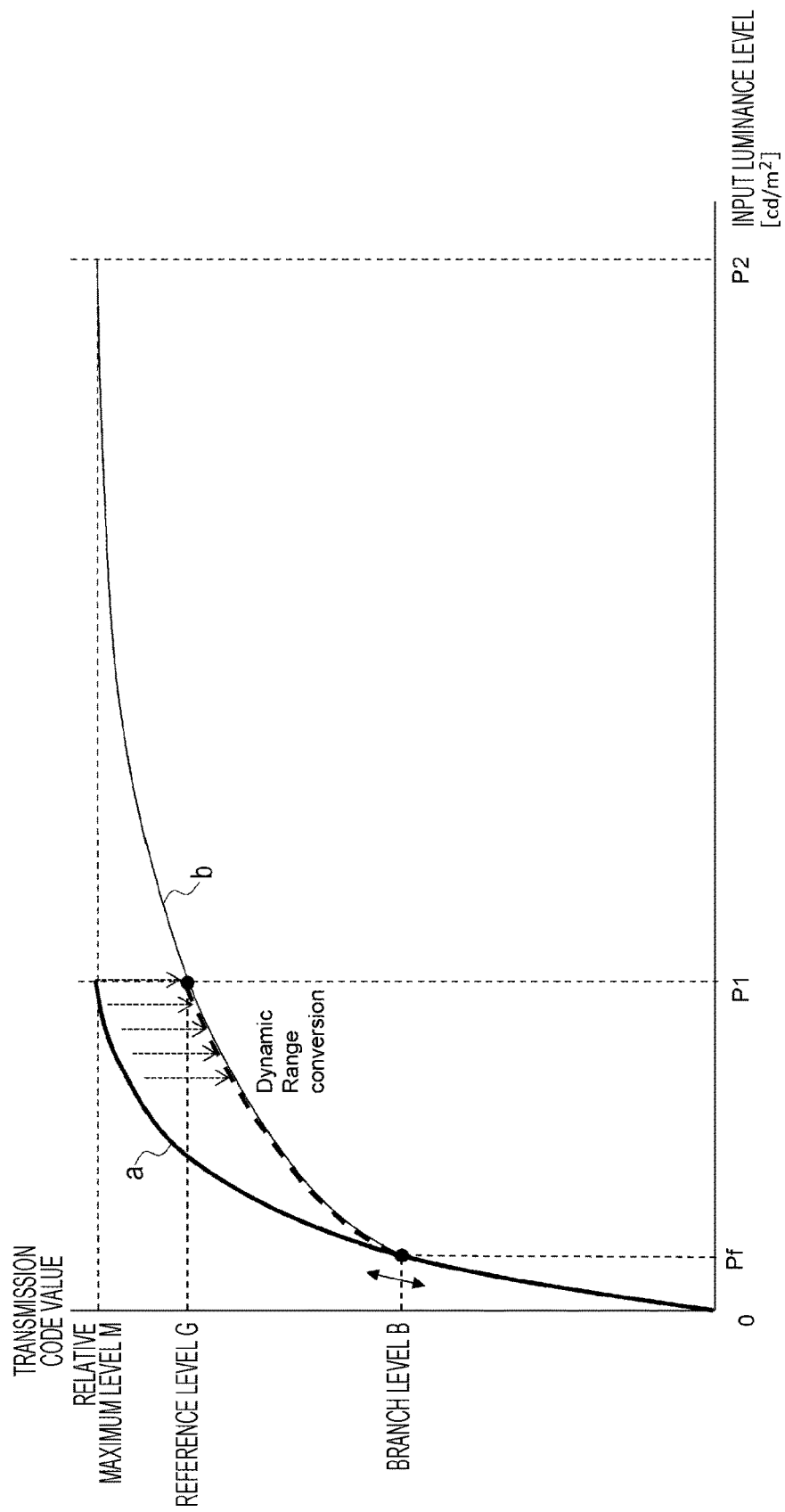
FIG. 3 is a diagram for describing an operation of a dynamic range conversion unit in the service transmitting system.

An 8-bit field of "referencelevel" indicates the reference level G (see FIG. 3). In this case, as the reference level G, a value specified with a value of 0 to 100 in a relative range normalized to "1" to the maximum is described. The receiving side recognizes a value obtained by dividing the aforementioned value by 100 as a relative reference level. The relative reference level configures the conversion coefficient as the conversion information of the dynamic range conversion.

An 8-bit field of "branchlevel" indicates the branch level B (see FIG. 3). In this case, as the branch level B, a value specified with a value of 0 to 100 in a relative range normalized to "1" to the maximum is described. The receiving side recognizes a value obtained by dividing the aforementioned value by 100 as the branch level.

An 8-bit field of "original_transferfunction" indicates a state of the photoelectric conversion of the input video data (a type of original transmission function characteristic). "1" indicates "BT.709-5 Transfer Function (SDR)". "14" indicates "10 bit BT.2020 Transfer Function (SDR)". "16" indicates "SMPTE 2084 Transfer Function (HDR1)". "25" indicates "HDR (HDR2)".

Figure 11:
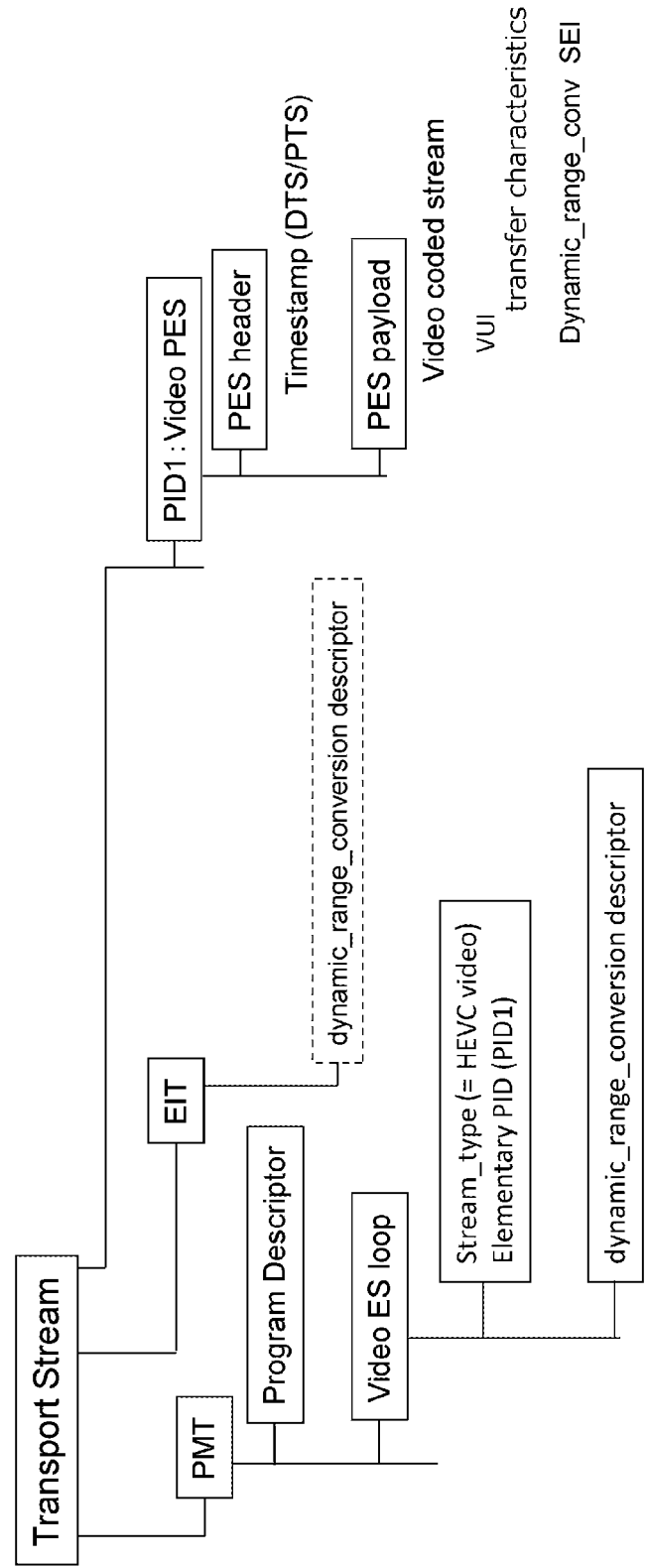
FIG. 11 is a diagram illustrating a structure example of a transport stream.

FIG. 11 illustrates a configuration example of the transport stream TS. In this configuration example, a PES packet "Video PES" of the video stream identified with PID1 exists. The meta-information such as the information indicating whether the stream is an SDR stream or an HDR stream, and the information indicating an electric-photo conversion characteristic corresponding to the photoelectric conversion characteristic included in the transmission video data V1 is inserted into an area of VUI of SPS of the access unit. Further, the dynamic range conversion SEI message including the meta-information such as the information indicating a state of the photoelectric conversion of the input video data (a type of original transmission function characteristic) and the conversion information of the dynamic range conversion is inserted into the access unit.

Further, a program map table (PMT) is included in the transport stream TS as program specific information (PSI). The PSI is information that describes to which program the elementary systems included in the transport stream belong. In the PMT, a program loop that describes information regarding the entire program exists.

In the PMT, an elementary stream loop including information regarding the elementary streams exists. In this configuration example, a video elementary stream loop (video ES loop) corresponding to the video stream exists. In the video elementary stream loop (video ES loop), information such as a stream type and a PID (packet identifier) is arranged corresponding to the video stream, and descriptor that describes information regarding the video stream is also arranged.

A value of "Stream_type" of the video stream is set to a value indicating an HEVC video stream, for example, and PID information indicates the PID1 provided to the PES packet "video PES" of the video stream. As one of the descriptor, dynamic range conversion descriptor including the meta-information such as the information indicating whether the stream is an SDR stream or an HDR stream, the information indicating an electric-photo conversion characteristic corresponding to the photoelectric conversion characteristic included in the transmission video data V1, the information indicating a state of photoelectric conversion of the input video data, and the like is inserted.

Further, the transport stream TS includes an event information table (EIT) as service information (SI) for management in units of events (programs). Insertion of the dynamic range conversion descriptor under arrangement of the EIT can also be considered.

An operation of the service transmitting system 100 illustrated in FIG. 2 will be briefly described. The HDR video data Vh as a high contrast camera output is supplied to the HDR photoelectric conversion unit 103. The HDR photoelectric conversion unit 103 applies photoelectric conversion with the HDR photoelectric conversion characteristic to the HDR video data Vh to obtain the HDR transmission video data (the transmission video data having the HDR photoelectric conversion characteristic) as video material produced by HDR OETF.

Further, the SDR video data Vs as a normal contrast camera output is supplied to the SDR photoelectric conversion unit 104. The SDR photoelectric conversion unit 104 applies photoelectric conversion with the SDR photoelectric conversion characteristic to the SDR video data Vs to obtain the SDR transmission video data (the transmission video data having the SDR photoelectric conversion characteristic) as video material produced by SDR OETF.

The SDR transmission video data obtained in the SDR photoelectric conversion unit 104 is supplied to the dynamic range conversion unit 105. The dynamic range conversion unit 105 applies the dynamic range conversion to the SDR transmission video on the basis of the conversion information (the conversion table or the conversion coefficient) supplied from the control unit 101. With the dynamic range conversion, the SDR transmission video data is converted into the HDR transmission video data (the transmission video data having the HDR photoelectric conversion characteristic) (see FIG. 3).

The switching switch 106 selectively takes out the SDR transmission video data (first transmission video data) obtained in the SDR photoelectric conversion unit 104, the HDR transmission video data (second transmission video data) obtained in the HDR photoelectric conversion unit 103, or the HDR transmission video data (third transmission video data) obtained in the dynamic range conversion unit 105 by control of the control unit 101. The transmission video data taken out in this way is converted from the RGB domain to the luminance and chrominance (YCbCr) domain by the RGB/YCbCr conversion unit 107.

The transmission video data V1 converted into the YCbCr domain is supplied to the video encoder 108. The video encoder 108 applies encoding such as MPEG4-AVC or HEVC to the transmission video data V1 to obtain the encoded video data, and generates the video stream VS including the encoded video data.

At this time, the video encoder 108 inserts the meta-information such as the information indicating whether the stream is an SDR stream or an HDR stream, and the information indicating an electric-photo conversion characteristic corresponding to the photoelectric conversion characteristic included in the transmission video data V1 into the area of the video usability information (VUI) of the SPS NAL unit of the access unit (AU). Further, the video encoder 108 inserts the newly defined dynamic range conversion SEI message (see FIG. 7) including the meta-information such as the information indicating a state of the photoelectric conversion of the input video data (a type of original transmission function characteristic) and the conversion information of the dynamic range conversion into the portion of "SEIs" of the access unit (AU).

The video stream VS obtained in the video encoder 108 is supplied to the container encoder 109. The container encoder 109 generates the transport stream TS including the video stream VS generated in the video encoder 108. This transport stream TS is transmitted on a broadcast wave packet or a network packet to the service receiver 200 by the transmitting unit 110.

At this time, the container encoder 109 inserts the meta-information such as the information indicating whether the stream is an SDR stream or an HDR stream, the information indicating an electric-photo conversion characteristic corresponding to the photoelectric conversion characteristic included in the transmission video data V1, and the information indicating a state of the photoelectric conversion of the input video data (a type of original transmission function characteristic) into the transport stream TS as a container. That is, the container encoder 109 inserts the dynamic range conversion descriptor (see FIG. 9) into under arrangement of the program map table or under arrangement of the event information table.

"Configuration Example of Service Receiver"

Figure 12:
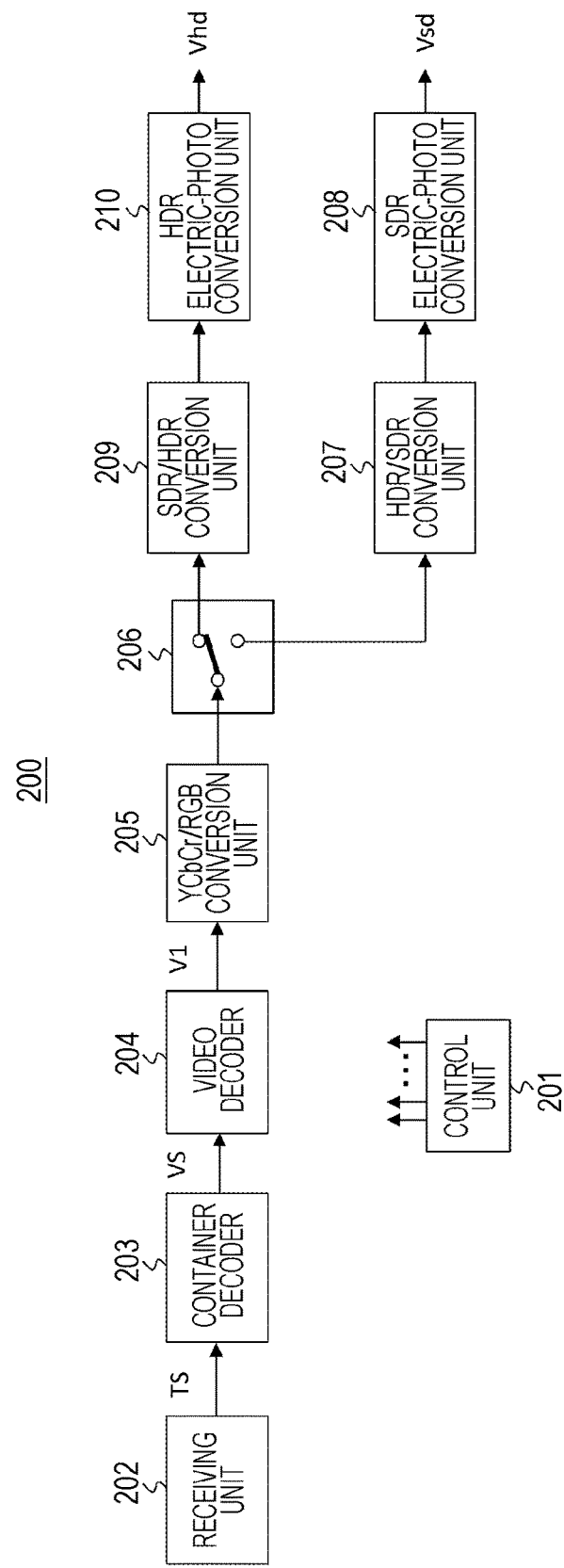
FIG. 12 is a block diagram illustrating a configuration example of a service receiver.

FIG. 12 illustrates a configuration example of the service receiver 200. The service receiver 200 includes a control unit 201, a receiving unit 202, a container decoder 203, a video decoder 204, an YCbCr/RGB conversion unit 205, and a switching switch 206. Further, the service receiver 200 includes an HDR/SDR conversion unit 207, an SDR electric-photo conversion unit 208, an SDR/HDR conversion unit 209, and an HDR electric-photo conversion unit 210.

The control unit 201 includes a central processing unit (CPU), and controls operations of the respective units of the service receiver 200 on the basis of a control program. The receiving unit 202 receives the transport stream TS on a broadcast wave pocket or a network pocket sent from the service transmitting system 100. The container decoder 203 extracts the video stream VS from the transport stream TS.

Further, the container decoder 203 extracts various types of information inserted in the transport stream TS, and sends the information to the control unit 201. The information includes the above-described dynamic range conversion descriptor (see FIG. 9). The control unit 201 recognizes, on the basis of description of the descriptor, whether the stream is an SDR stream or an HDR stream, the electric-photo conversion characteristic corresponding to the photoelectric conversion characteristic included in the transmission video data V1 included in the video stream VS, the state of the photoelectric conversion of the input video data at the transmitting side (the type of the original transmission function characteristic), and the like.

Further, with the recognition, the control unit 201 recognizes the type of the transmission video data V1 included in the video stream VS. As described above, the transmission video data V1 is one of the first transmission video data, the second transmission video data, and the third transmission video data. Here, the first transmission video data is the SDR transmission video data (the transmission video data having the SDR photoelectric conversion characteristic) obtained by applying the SDR photoelectric conversion to the SDR video data Vs, as described above.

Further, the second transmission video data is the HDR transmission video data (the transmission video data having the HDR photoelectric conversion characteristic) obtained by applying the HDR photoelectric conversion to the HDR video data Vh. Further, the third transmission video data is the HDR transmission video data (the transmission video data having the HDR photoelectric conversion characteristic) obtained by performing the dynamic range conversion to the SDR transmission video data obtained by applying the SDR photoelectric conversion to the SDR video data Vs.

In a case where the transmission video data V1 is the first transmission video data, the stream is the SDR stream, and the information indicating a state of photoelectric conversion of the input video data (hereinafter, appropriately referred to as "original electric-photo conversion information") at the transmitting side and the electric-photo conversion characteristic corresponding to the photoelectric conversion characteristic included in the transmission video data V1 (hereinafter, appropriately referred to as "current electric-photo conversion information") exhibit the same SDR electric-photo conversion characteristic. Therefore, the control unit 201 recognizes that the transmission video data V1 is the first transmission video data.

Further, in a case where the transmission video data V1 is the second transmission video data, the stream is the HDR stream, and the original electric-photo conversion information and the current electric-photo conversion information exhibit the same HDR electric-photo conversion characteristic. Therefore, the control unit 201 recognizes that the transmission video data V1 is the second transmission video data. Further, in a case where the transmission video data V1 is the third transmission video data, the stream is the HDR stream, and the original electric-photo conversion information exhibits the SDR electric-photo conversion characteristic but the current electric-photo conversion information exhibits the HDR electric-photo conversion characteristic. Therefore, the control unit 201 recognizes that the transmission video data V1 is the third transmission video data.

The video decoder 204 applies decoding processing to the video stream VS extracted in the container decoder 203 to obtain the transmission video data V1. Further, the video decoder 204 extracts information such as a parameter set and an SEI message inserted in the access units from the video stream VS, and sends the information to the control unit 201.

The information includes the meta-information such as the information indicating whether the stream is an SDR stream or an HDR stream, and the information indicating an electric-photo conversion characteristic corresponding to the photoelectric conversion characteristic included in the transmission video data V1, which is inserted in the area of the VUI of the SPS NAL unit of the access unit. Further, the information includes the dynamic range conversion SEI message (see FIG. 7) including the meta-information such as the information indicating a state of the photoelectric conversion of the input video data (a type of original transmission function characteristics), and the conversion information of the dynamic range conversion.

The control unit 201 recognizes, on the basis of the description of the descriptor, whether the stream is an SDR stream or an HDR stream, the electric-photo conversion characteristic corresponding to the photoelectric conversion characteristic included in the transmission video data V1 included in the video stream VS, and the state of the photoelectric conversion of the input video data at the transmitting side (the type of the original transmission function characteristic). Further, with the recognition, the control unit 201 recognizes the type of the transmission video data V1 included in the video stream VS.

The control unit 201 performs similar recognition from the described information of the dynamic range conversion descriptor, as described above. However, identification information of a container level of the descriptor cannot follow dynamic change in units of video frames. Recognition based on the information from the area of the VUI of the SPS NAL unit of the access unit of the video stream VS and the SEI message enables following of the dynamic change in units of frames.

The YCbCr/RGB conversion unit 205 converts the transmission video data V1 obtained in the video decoder 204 from the luminance and chrominance (YCbCr) domain into the RGB domain. Note that the domain of the color space is not limited to the RGB domain, and the luminance and chrominance domain is not limited to YCbCr. The switching switch 206 sends the transmission video data V1, which has been converted into the RGB domain, to the HDR/SDR convers ion unit 207 or the SDR/HDR conversion unit 209 under control of the control unit 201.

In this case, in a case where a display monitor (not illustrated) supports SDR, that is, the display capability of the display monitor is SDR, the switching switch 206 sends the transmission video data V1 to the HDR/SDR conversion unit 207. On the other hand, in a case where the display monitor supports HDR, that is, the display capability of the display monitor is HDR, the switching switch 206 sends the transmission video data V1 to the SDR/HDR conversion unit 209. The control unit 201 provides the dynamic range conversion information (the conversion table and the conversion coefficient) recognized from the dynamic range conversion SEI message (see FIG. 7) to the HDR/SDR conversion unit 207 and the SDR/HDR conversion unit 209.

The HDR/SDR conversion unit 207 applies the dynamic range conversion to the HDR transmission video data to obtain the SDR transmission video data. The HDR/SDR conversion unit 207 functions in a case where the transmission video data V1 is the second transmission video data or the third transmission video data as the HDR transmission video data, and outputs the input as it is in a case where the transmission video data V1 is the first transmission video data as the SDR transmission video data.

Details of the dynamic range conversion in a case where the transmission video data V1 is the HDR transmission video data (third transmission video data) will be described with reference to FIG. 13. The vertical axis represents an output luminance level and corresponds to the horizontal axis of FIG. 3. Further, the horizontal axis represents a transmission code value and corresponds to the vertical axis of FIG. 3. The solid line a represents an SDR EOTF curve illustrating the SDR electric-photo conversion characteristic. This SDR EOTF curve corresponds to the SDR OETF curve illustrated by the solid line a in FIG. 3. The solid line b is an HDR EOTF curve illustrating the HDR electric-photo conversion characteristic. This HDR EOTF curve corresponds to the HDR OETF curve illustrated by the solid line b in FIG. 3. Note that FIG. 14 illustrates an example of a case where the branch level B is 0, and is an example corresponding to the example of FIG. 4.

In the dynamic range conversion in the HDR/SDR conversion unit 207, conversion reverse to the conversion in the dynamic range conversion unit 105 in FIG. 2 is performed. That is, In this dynamic range conversion, the input data from the branch level B to the reference level G, of the HDR transmission video data, are converted to accord with values of the conversion data with the SDR photoelectric conversion characteristic. In this case, the reference level G is converted to accord with the relative maximum level M as the SDR maximum level. Note that the input data of less than the branch level B are output as output data as they are.

Here, the conversion information is provided as the conversion table or the conversion coefficient from the control unit 201, for example, as described above. In a case of the conversion table, the HDR/SDR conversion unit 207 performs conversion by reference to the conversion table. On the other hand, in a case of the conversion coefficient, the HDR/SDR conversion unit 207 performs conversion by calculation using the conversion coefficient. For example, the HDR/SDR conversion unit 207 performs conversion regarding the input data from the branch level B to the reference level G by the following formula (2):

The output data=the branch level $B$+(the input data branch level $B$)*1/C . . .   (2)

where the conversion coefficient is C.

Figure 15:
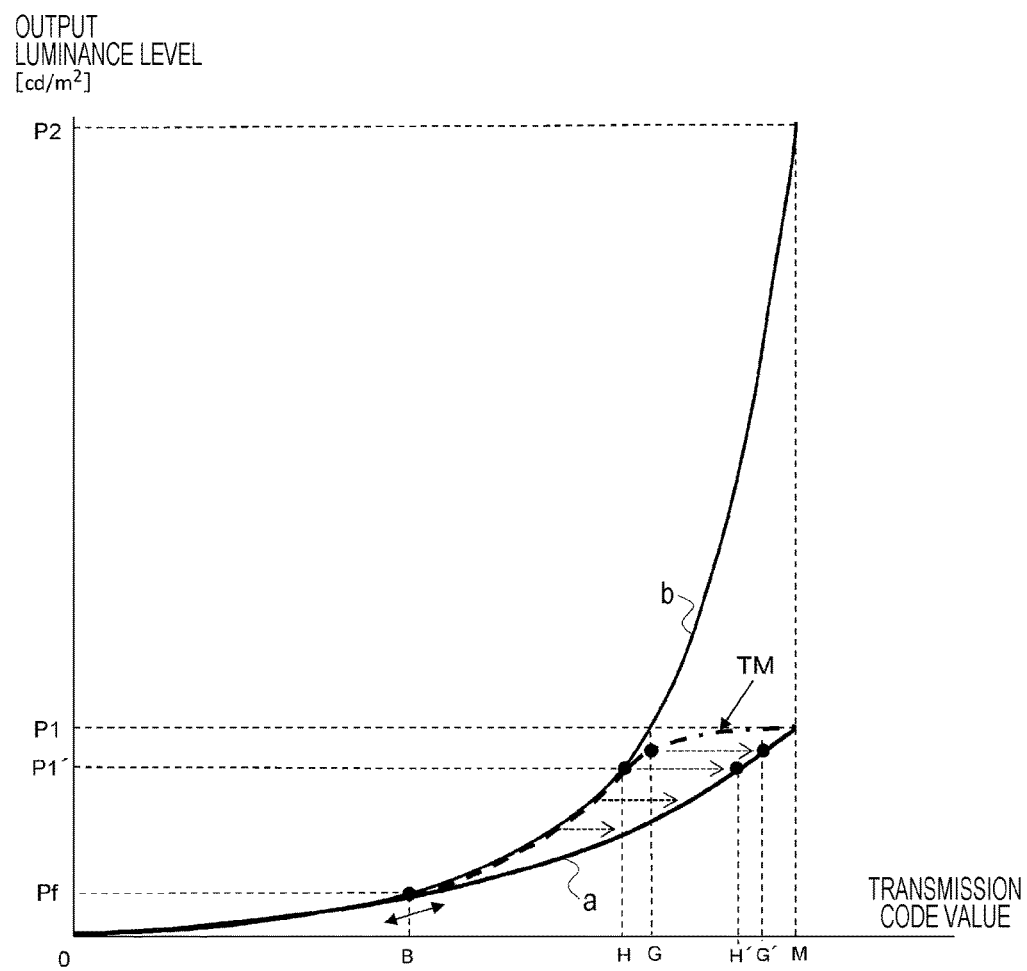
FIG. 15 is a diagram for describing an operation of the HDR/SDR conversion unit in the service receiver.

Next, details of the dynamic range conversion in a case where the transmission video data V1 is the HDR transmission video data (second transmission video data) will be described with reference to FIG. 15. In this case, the HDR/SDR conversion unit 207 converts the input level to the HDR EOTF curve into the input level to the SDR EOTF curve. In FIG. 15, a portion corresponding to FIG. 13 is denoted with the same sign. Note that P1' represents the output luminance level corresponding to a predetermined level H lower than the reference level G.

In this case, in the dynamic range conversion in the HDR/SDR conversion unit 207, the input data up to the predetermined level H lower than the reference level G is similarly converted to the case where the transmission video data V1 is the HDR transmission video data (third transmission video data). Then, the input data from the level H to the level M is converted on the basis of a tone mapping characteristic TM illustrated by the one-dot chain line, and the output data is obtained. In this case, for example, the level H is converted into a level H', the reference level G is converted into a level G', and the level M is remains as it is.

The level conversion based on the tone mapping characteristic TM is made regarding the input data from the level H to the level M in this way, whereby a decrease in deterioration of image quality due to level saturation from the reference level G to the relative maximum level M becomes possible.

The SDR electric-photo conversion unit 209 applies the SDR electric-photo conversion characteristic to the SDR transmission video data output from the HDR/SDR conversion unit 207 to obtain display video data Vsd for displaying an SDR image.

The SDR/HDR conversion unit 209 applies the dynamic range conversion to the SDR transmission video data to obtain the HDR transmission video data. The SDR/HDR conversion unit 209 functions in a case where the transmission video data V1 is the first transmission video data as the SDR transmission video data, and outputs the input as it is in a case where the transmission video data V1 is the second transmission video data or the third transmission video data as the HDR transmission video data.

Figure 16:
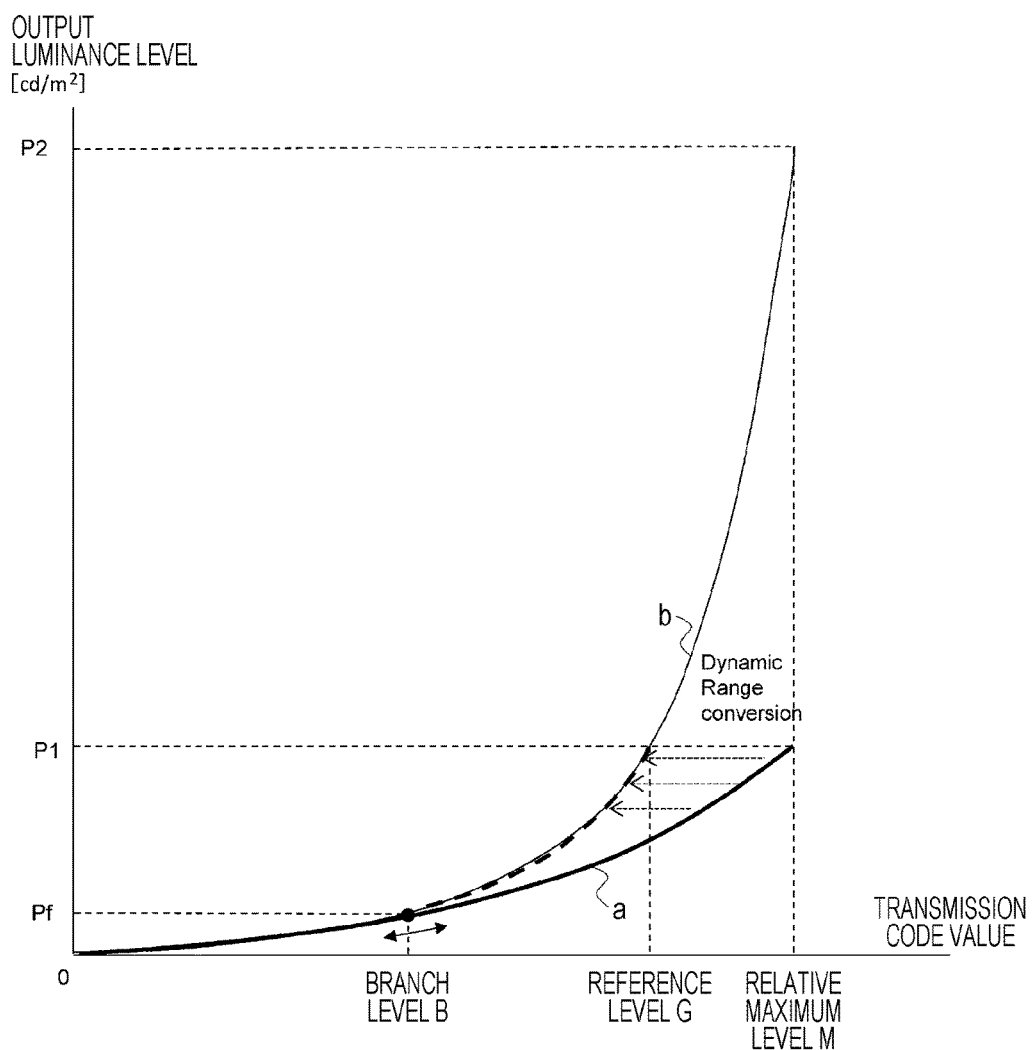
FIG. 16 is a diagram for describing an operation of an SDR/HDR conversion unit in the service receiver.

Details of the dynamic range conversion in a case where the transmission video data V1 is the SDR transmission video data (first transmission video data) will be described with reference to FIG. 16. In this case, the SDR/HDR conversion unit 209 converts the input level to the SDR EOTF curve into the input level to the HDR EOTF curve. In FIG. 16, a portion corresponding to FIG. 13 is denoted with the same sign.

In the dynamic range conversion in the SDR/HDR conversion unit 209, conversion similar to the conversion in the dynamic range conversion unit 105 in FIG. 2 is performed. That is, in the dynamic range conversion, the input data from the branch level B to the relative maximum level M as the SDR maximum level, of the SDR transmission video data, are converted to accord with values of the conversion data with the HDR photoelectric conversion characteristic. In this case, the relative maximum level M is converted to accord with the reference level G. Note that the input data of less than the branch level B are output as output data as they are.

The HDR photoelectric conversion unit 210 applies the HDR electric-photo conversion characteristic to the HDR transmission video data output from the SDR/HDR conversion unit 209 to obtain display video data Vhd for displaying an HDR image.

An operation of the service receiver 200 illustrated in FIG. 12 will be briefly described. The receiving unit 202 receives the transport stream TS on a broadcast wave packet or a network packet sent from the service transmitting system 100. This transport stream TS is supplied to the container decoder 203. The container decoder 203 extracts the video stream VS from the transport stream TS.

Further, the container decoder 203 extracts various types of information inserted in the transport stream TS as a container, and sends the information to the control unit 201. The information includes the above-described dynamic range conversion descriptor (see FIG. 9). The control unit 201 recognizes, on the basis of the information, whether the stream is an SDR stream or an HDR stream, the electric-photo conversion characteristic corresponding to the photoelectric conversion characteristic included in the transmission video data V1 included in the video stream VS, the state of the photoelectric conversion of the input video data at the transmitting side (the type of the original transmission function characteristic), and the like, and further recognizes the type of the transmission video data V1.

The video stream VS extracted in the container decoder 203 is supplied to the video decoder 204. The video decoder 204 applies decoding processing to the video stream VS to obtain the transmission video data V1. The transmission video data V1 is the first transmission video data as the SDR transmission video data (the transmission video data having the SDR photoelectric conversion characteristic) or the second transmission video data or the third transmission video data as the HDR transmission video data (the transmission video data having the HDR photoelectric conversion characteristic).

Further, the video decoder 204 extracts the parameter set and the SEI message inserted in the access units that configure the video stream VS, and sends the information to the control unit 201. The information includes the information of the area of the VUI of the SPS NAL unit of the access unit, and the dynamic range conversion SEI message (see FIG. 7). The control unit 201 recognizes, on the basis of the information, whether the stream is an SDR stream or an HDR stream, the electric-photo conversion characteristic corresponding to the photoelectric conversion characteristic included in the transmission video data V1 included in the video stream VS, the state of the photoelectric conversion of the input video data at the transmitting side (the type of the original transmission function characteristic), and the like, and further recognizes the type of the transmission video data V1.

The transmission video data V1 obtained in the video decoder 204 is converted from the luminance and chrominance (CbCr) domain to the RGB domain in the YCbCr/RGB conversion unit 205. The transmission video data V1, which has been converted into the RGB domain, is supplied to the HDR/SDR conversion unit 207 through the switching switch 206 in a case where the display monitor supports SDR.

Figure 13:
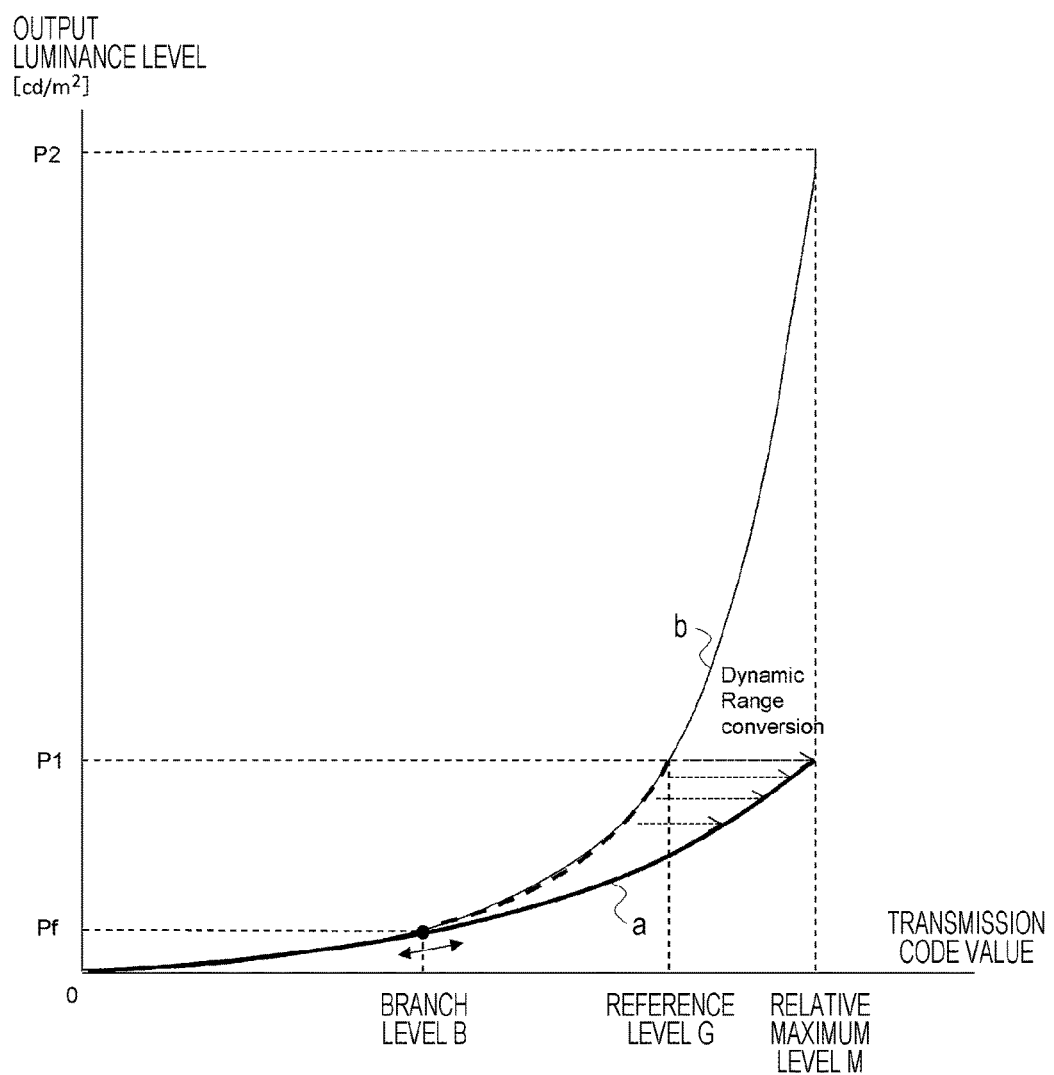
FIG. 13 is a diagram for describing an operation of an HDR/SDR conversion unit in the service receiver.
Figure 14:
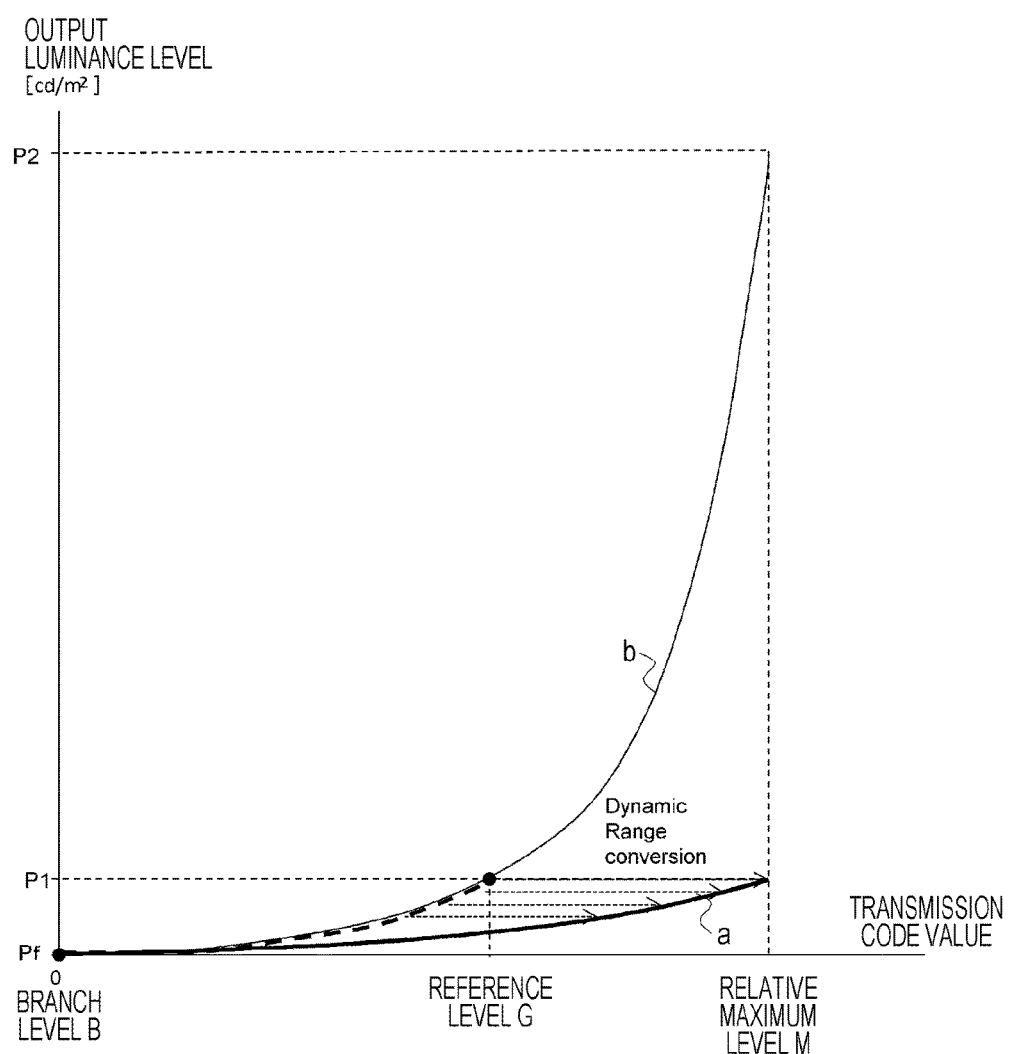
FIG. 14 is a diagram for describing an operation of the HDR/SDR conversion unit in the service receiver.

The HDR/SDR conversion unit 207 supplies the dynamic range conversion to the HDR transmission video data to obtain the SDR transmission video data in a case where the transmission video data V1 is the second transmission video data or the third transmission video data as the HDR transmission video data (see FIGS. 13 to 15). Note that the input is output as it is in a case where the transmission video data V1 is the first transmission video data as the SDR transmission video data.

The SDR transmission video data obtained in the HDR/SDR conversion unit 207 is supplied to the SDR electric-photo conversion unit 208. The SDR electric-photo conversion unit 208 applies the SDR electric-photo conversion characteristic to the SDR transmission video data to obtain the display video data Vsd for displaying the SDR image. Display mapping processing is appropriately applied to the display video data Vsd according to the display capability of the display monitor, and then the display video data Vsd is supplied to the display monitor, and the SDR image is displayed.

Further, the transmission video data V1, which has been converted into the RGB domain in the YCbCr/RGB conversion unit 205, is supplied to the SDR/HDR conversion unit 209 through the switching switch 206 in a case where the display monitor supports HDR.

The SDR/HDR conversion unit 209 applies the dynamic range conversion to the SDR transmission video data to obtain the HDR transmission video data in a case where the transmission video data V1 is the first transmission video data as the SDR transmission video data (see FIG. 16). Note that the input is output as it is in a case where the transmission video data V1 is the second transmission video data or the third transmission video data as the HDR transmission video data.

The HDR transmission video data obtained in the SDR/HDR conversion unit 209 is supplied to the HDR electric-photo conversion unit 210. The HDR electric-photo conversion unit 210 applies the HDR electric-photo conversion characteristic to the HDR transmission video data to obtain the display video data Vhd for displaying an HDR image. Display mapping processing is appropriately applied to the display video data Vhd according to the display capability of the display monitor, and then the display video data Vhd is supplied to the display monitor, and the HDR image is displayed.

As described above, the transmitting and receiving system 10 illustrated in FIG. 1 transmits the information indicating a state of photoelectric conversion of the input video data in transmitting the transmission video data having the predetermined photoelectric conversion characteristic obtained by processing the input video data. Therefore, the receiving side can appropriately perform the processing of obtaining the display image data from the transmission video data.

2. Modification

Note that, in the above embodiment, the example in which the container is the transport stream (MPEG-2 TS) has been described. However, the present technology is not limited to the case where the container is the transport stream, and a layer of video can be realized by the same method in a case of another packet, for example, ISO base media file format (ISOBMFF) or Mpeg media transport (MMT).

Figure 17:
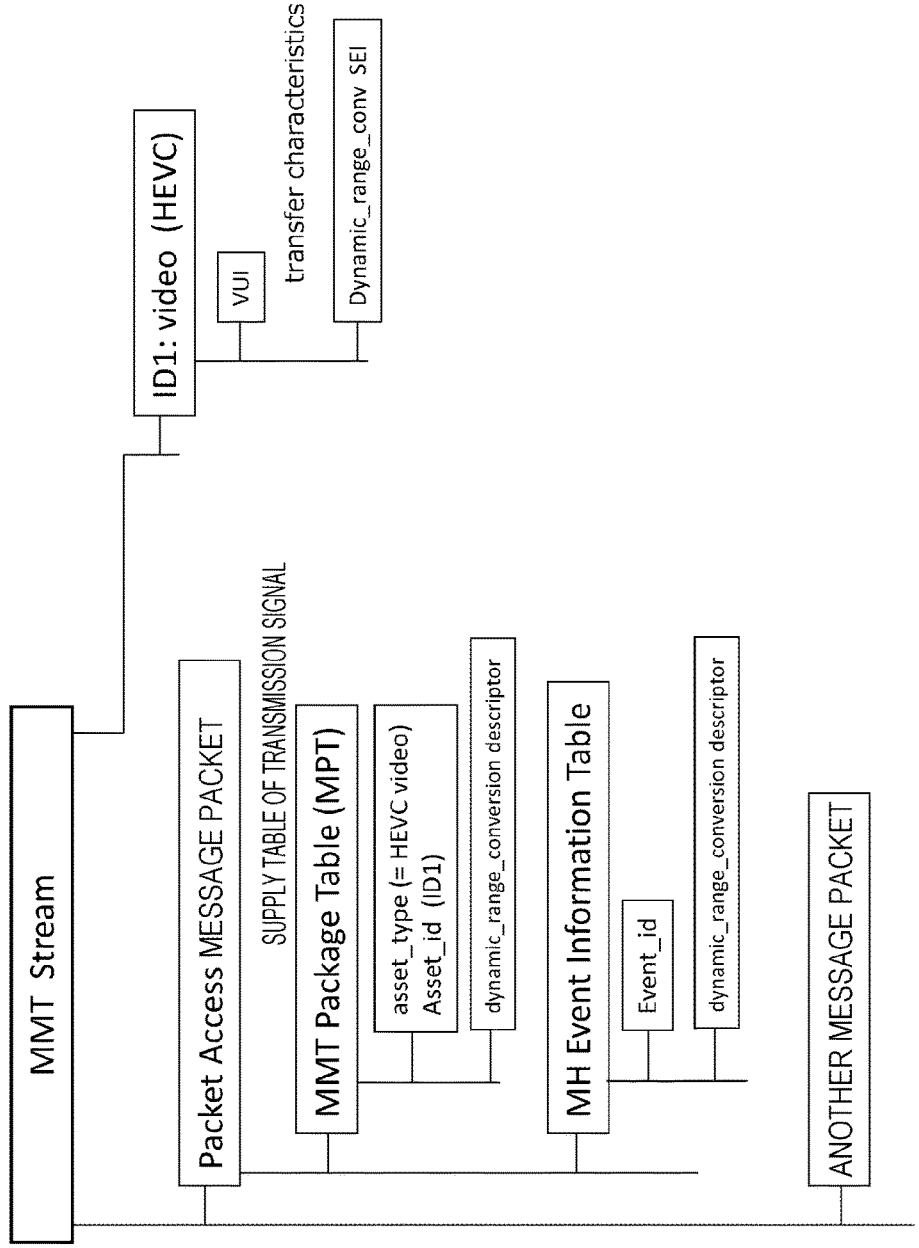
FIG. 17 is a diagram illustrating a structure example of MMT.

FIG. 17 illustrated an MMT structure. In the MMT stream, an MMT packet of assets such as video and audio exists. In the illustrated example, an MMT packet of an asset of video identified with ID1 exists. Meta-information such as information indicating whether a stream is an SDR stream or an HDR stream, information indicating an electric-photo conversion characteristic corresponding to a photoelectric conversion characteristic included in transmission video data V1 is inserted into an area of VUI of SPS of an access unit. Further, a dynamic range conversion SEI message having meta-information such as information indicating a state of photoelectric conversion of input video data (a type of original transmission function characteristic), and conversion information of dynamic range conversion is inserted into the access unit.

Further, a message packet such as a packet access (PA) message packet exists in the MMT stream. The PA message packet includes a table such as an MMT packet table. An MP table includes information of each asset. Here, dynamic range conversion descriptor including the meta-information such as information indicating whether a stream is an SDR stream or an HDR stream, information indicating an electric-photo conversion characteristic corresponding to a photoelectric conversion characteristic included in transmission video data V1, and information indicating a state of photoelectric conversion of input video data is inserted in relation to the asset of the video.

Further, in a case where an MH event information table is included for EPG program display, descriptor is arranged together with an identifier (id) of the program event. As this descriptor, the dynamic range conversion descriptor can be arranged to indicate that the program supports HDR.

Further, in the above-described embodiment, the transmitting and receiving system 10 configured from the service transmitting system 100 and the service receiver 200 has been described. However, the configuration of the transmitting and receiving system to which the present technology can be applied is not limited thereto. For example, the service receiver 200 may be configured from a set top box (STB) and a monitor connected with a digital interface such as high-definition multimedia interface (HDMI). Note that "HDMI" is a registered trademark.

Further, in a case where the values of the information of the reference level and the branch level can be uniquely obtained by reference to the photoelectric conversion characteristic, identification information of the photoelectric conversion characteristic can be substituted without sending the level values themselves, and can be treated as one of the present embodiment in supply of such information.

Further, the present technology can take the configurations below.

(1) A transmitting device including:
a photoelectric conversion processing unit configured to process input video data to obtain transmission video data having a predetermined photoelectric conversion characteristic;
an encoding unit configured to apply encoding processing to the transmission video data to obtain a video stream;
a transmitting unit configured to transmit a container of a predetermined format, including the video stream; and
an information insertion unit configured to insert information indicating a state of photoelectric conversion of the input video data into the video stream and/or the container.

(2) The transmitting device according to (1), in which
the photoelectric conversion processing unit
performs photoelectric conversion with a normal dynamic range photoelectric conversion characteristic, for normal dynamic range video data as the input video data, to obtain first transmission video data having the normal dynamic range photoelectric conversion characteristic,
performs photoelectric conversion with a high dynamic range photoelectric conversion characteristic, for high dynamic range video data as the input video data, to obtain second transmission video data having the high dynamic range photoelectric conversion characteristic, or
performs dynamic range conversion on the basis of conversion information for converting a value of conversion data with a normal dynamic range photoelectric conversion characteristic into a value of conversion data with a high dynamic range photoelectric conversion characteristic, for the input video data obtained by performing photoelectric conversion with a normal dynamic range photoelectric conversion characteristic, for normal dynamic range video data, to obtain third transmission video data having the high dynamic range photoelectric conversion characteristic.

(3) The transmitting device according to (2), in which,
when the photoelectric conversion processing unit obtains the third transmission video data,
the information insertion unit further inserts the conversion information into the video stream and/or the container.

(4) The transmitting device according to (2) or (3), in which
the conversion information is a conversion coefficient.

(5) The transmitting device according to (2) or (3), in which
the conversion information is a conversion table.

(6) The transmitting device according to any of (1) to (5), in which
the information insertion unit further inserts information indicating an electric-photo conversion characteristic corresponding to the predetermined photoelectric conversion characteristic into the video stream and/or the container.

(7) The transmitting device according to any of (1) to (6), in which
the information indicating a state of photoelectric conversion of the input video data is
information indicating an electric-photo conversion characteristic corresponding to a conversion characteristic of the photoelectric conversion when the photoelectric conversion is performed for the input video data, and
information indicating an electric-photo conversion characteristic corresponding to the predetermined photoelectric conversion characteristic when the photoelectric conversion is not performed for the input video data.

(8) The transmitting device according to any of (1) to (7), in which
the information insertion unit further inserts a reference level as a reference luminance level or a branch level as a luminance level at which a curve of a normal dynamic range photoelectric conversion characteristic and a curve of a high dynamic range photoelectric conversion characteristic branch from a same orbit and are separated into the video stream and/or the container.

(9) A transmitting method including:
a photoelectric conversion processing step of processing input video data to obtain transmission video data having a predetermined photoelectric conversion characteristic;
an encoding step of applying encoding processing to the transmission video data to obtain a video stream;
a transmitting step of transmitting, by a transmitting unit, a container of a predetermined format, including the video stream; and
an information insertion step of inserting information indicating a state of photoelectric conversion of the input video data into the video stream and/or the container.

(10) A receiving device further including:
a receiving unit configured to receive a container of a predetermined format, including a video stream obtained by encoding transmission video data,
the transmission video data being transmission video data having a predetermined photoelectric conversion characteristic obtained by processing input video data at a transmitting side, and
information indicating a state of photoelectric conversion of the input video data being inserted into the video stream and/or the container,
the receiving device further including:
a decoding unit configured to apply decoding processing to the video stream to obtain the transmission video data;
an information extraction unit configured to extract the information indicating a state of photoelectric conversion of the input video data from the video stream and/or the container; and
a processing unit configured to apply electric-photo conversion processing based on the information extracted in the information extraction unit, information of the predetermined photoelectric conversion characteristic, and display capability to the transmission video data obtained in the decoding unit to obtain display image data.

(11) The receiving device according to (10), in which
the transmission video data is
first transmission video data having a normal dynamic range photoelectric conversion characteristic obtained by performing photoelectric conversion with the normal dynamic range photoelectric conversion characteristic, for normal dynamic range video data as the input video data,
second transmission video data having a high dynamic range photoelectric conversion characteristic obtained by performing photoelectric conversion with the high dynamic range photoelectric conversion characteristic, for high dynamic range video data as the input video data, or
third transmission video data having a high dynamic range photoelectric conversion characteristic obtained by performing dynamic range conversion on the basis of conversion information for converting a value of conversion data with a normal dynamic range photoelectric conversion characteristic into a value of conversion data with a high dynamic range photoelectric conversion characteristic, for the input video data obtained by performing photoelectric conversion with a normal dynamic range photoelectric conversion characteristic, for normal dynamic range video data.

(12) The receiving device according to (11), in which,
when the display capability is a high dynamic range, the processing unit applies electric-photo conversion with a high dynamic range electric-photo conversion characteristic to the transmission video data after performing dynamic range conversion for the transmission video data to obtain the display image data in a case where the transmission video data is the first transmission video data, and applies electric-photo conversion with a high dynamic range electric-photo conversion characteristic to the transmission video data to obtain the display image data in a case where the transmission video data is the second transmission video data or the third transmission video data.

(13) The receiving device according to (11), in which, when the display capability is a normal dynamic range, the processing unit applies electric-photo conversion with a normal dynamic range electric-photo conversion characteristic to the transmission video data to obtain the display image data in a case where the transmission video data is the first transmission video data, and applies electric-photo conversion with a normal dynamic range electric-photo conversion characteristic to the transmission video data after performing dynamic range conversion for the transmission video data to obtain the display image data in a case where the transmission video data is the second transmission video data or the third transmission video data.

(14) A receiving method including:

a receiving step of receiving, by a receiving unit, a container of a predetermined format, including a video stream obtained by encoding transmission video data, the transmission video data being transmission video data having a predetermined photoelectric conversion characteristic obtained by processing input video data at a transmitting side, and information indicating a state of photoelectric conversion of the input video data being inserted into the video stream and/or the container, the receiving device further including:

a decoding step of applying decoding processing to the video stream to obtain the transmission video data;

an information extraction step of extracting the information indicating a state of photoelectric conversion of the input video data from the video stream and/or the container; and a processing step of applying electric-photo conversion processing based on the information extracted in the information extraction step, information of the predetermined photoelectric conversion characteristic, and display capability to the transmission video data obtained in the decoding step to obtain display image data.

A main characteristic of the present technology is to transmit the information indicating a state of photoelectric conversion of the input video data in transmitting the transmission video data having a predetermined photoelectric conversion characteristic obtained by processing the input video data, thereby to enable the receiving side to appropriately perform the processing of obtaining the display image data from the transmission video data (see FIG. 11).

REFERENCE SIGNS LIST

Transmitting and receiving system
100 Service transmitting system
101 Control unit
103 HDR photoelectric conversion unit
104 SDR photoelectric conversion unit
105 Dynamic range conversion unit
106 Switching switch
107 RGB/YCbCr conversion unit
108 Video encoder
109 Container encoder
110 Transmitting unit
200 Service receiver
201 Control unit
202 Receiving unit
203 Container decoder
204 Video decoder
205 YCbCr/RGB conversion unit
206 Switching switch
207 HDR/SDR conversion unit
208 SDR electric-photo conversion unit
209 SDR/HDR conversion unit
210 HDR electric-photo conversion unit

The invention claimed is:

1. A transmitting device comprising:
processing circuitry configured to
process input video data to obtain transmission video data having a predetermined photoelectric conversion characteristic, wherein the processing includes
performing photoelectric conversion with a normal dynamic range photoelectric conversion characteristic, for normal dynamic range video data as the input video data, to obtain first transmission video data having the normal dynamic range photoelectric conversion characteristic,
performing photoelectric conversion with a high dynamic range photoelectric conversion characteristic, for high dynamic range video data as the input video data, to obtain second transmission video data having the high dynamic range photoelectric conversion characteristic; or
performing dynamic range conversion on the basis of conversion information for converting a value of conversion data with a normal dynamic range photoelectric conversion characteristic into a value of conversion data with a high dynamic range photoelectric conversion characteristic, for the input video data obtained by performing photoelectric conversion with a normal dynamic range photoelectric conversion characteristic, for normal dynamic range video data, to obtain third transmission video data having the high dynamic range photoelectric conversion characteristic,
apply encoding processing to the transmission video data to obtain a video stream,
transmit a container of a predetermined format, including the video stream, and
insert information indicating a state of photoelectric conversion of the input video data into the video stream and/or the container.

2. The transmitting device according to claim 1, wherein, when obtaining the third transmission video data, the processing circuitry is further configured to
insert the conversion information into the video stream and/or the container.

3. The transmitting device according to claim 1, wherein the conversion information is a conversion coefficient.

4. The transmitting device according to claim 1, wherein the conversion information is a conversion table.

5. The transmitting device according to claim 1, wherein the processing circuitry is further configured to
insert information indicating an electric-photo conversion characteristic corresponding to the predetermined photoelectric conversion characteristic into the video stream and/or the container.

6. The transmitting device according to claim 1, wherein the information indicating a state of photoelectric conversion of the input video data is information indicating an electric-photo conversion characteristic corresponding to a conversion characteristic of the photoelectric conversion when the photoelectric conversion is performed for the input video data, and
information indicating an electric-photo conversion characteristic corresponding to the predetermined photoelectric conversion characteristic when the photoelectric conversion is not performed for the input video data.

7. The transmitting device according to claim 1, wherein the processing circuitry is further configured to insert a reference level as a reference luminance level or a branch level as a luminance level at which a curve of a normal dynamic range photoelectric conversion characteristic and a curve of a high dynamic range photoelectric conversion characteristic branch from a same orbit and are separated into the video stream and/or the container.

8. A transmitting method comprising:
a photoelectric conversion processing step of processing input video data to obtain transmission video data having a predetermined photoelectric conversion characteristic, wherein the processing includes
performing photoelectric conversion with a normal dynamic range photoelectric conversion characteristic, for normal dynamic range video data as the input video data, to obtain first transmission video data having the normal dynamic range photoelectric conversion characteristic,
performing photoelectric conversion with a high dynamic range photoelectric conversion characteristic, for high dynamic range video data as the input video data, to obtain second transmission video data having the high dynamic range photoelectric conversion characteristic; or
performing dynamic range conversion on the basis of conversion information for converting a value of conversion data with a normal dynamic range photoelectric conversion characteristic into a value of conversion data with a high dynamic range photoelectric conversion characteristic, for the input video data obtained by performing photoelectric conversion with a normal dynamic range photoelectric conversion characteristic, for normal dynamic range video data, to obtain third transmission video data having the high dynamic range photoelectric conversion characteristic;
an encoding step of applying encoding processing to the transmission video data to obtain a video stream;
a transmitting step of transmitting, by a transmitter, a container of a predetermined format, including the video stream; and
an information insertion step of inserting information indicating a state of photoelectric conversion of the input video data into the video stream and/or the container.

9. A receiving device comprising:
processing circuitry configured to
receive a container of a predetermined format, including a video stream obtained by encoding transmission video data, the transmission video data being transmission video data having a predetermined photoelectric conversion characteristic obtained by processing input video data at a transmitting side with information indicating a state of photoelectric conversion of the input video data being inserted into the video stream and/or the container, wherein the transmission video data includes
a first transmission video data having a normal dynamic range photoelectric conversion characteristic obtained by performing photoelectric conversion with the normal dynamic range photoelectric conversion characteristic, for normal dynamic range video data as the input video data,
a second transmission video data having a high dynamic range photoelectric conversion characteristic obtained by performing photoelectric conversion with the high dynamic range photoelectric conversion characteristic, for high dynamic range video data as the input video data, or
a third transmission video data having a high dynamic range photoelectric conversion characteristic obtained by performing dynamic range conversion on the basis of conversion information for converting a value of conversion data with a normal dynamic range photoelectric conversion characteristic into a value of conversion data with a high dynamic range photoelectric conversion characteristic, for the input video data obtained by performing photoelectric conversion with a normal dynamic range photoelectric conversion characteristic, for normal dynamic range video data;
apply decoding processing to the video stream to obtain the transmission video data;
extract the information indicating a state of photoelectric conversion of the input video data from the video stream and/or the container; and
apply electric-photo conversion processing based on the extracted information, information of the predetermined photoelectric conversion characteristic, and display capability to the transmission video data obtained to obtain display image data.

10. The receiving device according to claim 9, wherein, when the display capability is a high dynamic range, the processing-unit circuitry is further configured to
apply electric-photo conversion with a high dynamic range electric-photo conversion characteristic to the transmission video data after performing dynamic range conversion for the transmission video data to obtain the display image data in a case where the transmission video data is the first transmission video data, and
apply electric-photo conversion with a high dynamic range electric-photo conversion characteristic to the transmission video data to obtain the display image data in a case where the transmission video data is the second transmission video data or the third transmission video data.

11. The receiving device according to claim 9, wherein, when the display capability is a normal dynamic range, the processing circuitry is further configured to
apply electric-photo conversion with a normal dynamic range electric-photo conversion characteristic to the transmission video data to obtain the display image data in a case where the transmission video data is the first transmission video data, and
apply electric-photo conversion with a normal dynamic range electric-photo conversion characteristic to the transmission video data after performing dynamic range conversion for the transmission video data to obtain the display image data in a case where the transmission video data is the second transmission video data or the third transmission video data.

12. A receiving method comprising:

receiving, by a receiver, a container of a predetermined format, including a video stream obtained by encoding transmission video data, the transmission video data being transmission video data having a predetermined photoelectric conversion characteristic obtained by processing input video data at a transmitting side with information indicating a state of photoelectric conversion of the input video data being inserted into the video stream and/or the container, wherein the transmission video data includes a first transmission video data having a normal dynamic range photoelectric conversion characteristic obtained by performing photoelectric conversion with the normal dynamic range photoelectric conversion characteristic, for normal dynamic range video data as the input video data, a second transmission video data having a high dynamic range photoelectric conversion characteristic obtained by performing photoelectric conversion with the high dynamic range photoelectric conversion characteristic, for high dynamic range video data as the input video data, or a third transmission video data having a high dynamic range photoelectric conversion characteristic obtained by performing dynamic range conversion on the basis of conversion information for converting a value of conversion data with a normal dynamic range photoelectric conversion characteristic into a value of conversion data with a high dynamic range photoelectric conversion characteristic, for the input video data obtained by performing photoelectric conversion with a normal dynamic range photoelectric conversion characteristic, for normal dynamic range video data;

applying decoding processing to the video stream to obtain the transmission video data;

extracting the information indicating a state of photoelectric conversion of the input video data from the video stream and/or the container; and applying electric-photo conversion processing based on the information extracted in the information extraction step, information of the predetermined photoelectric conversion characteristic, and display capability to the transmission video data obtained in the decoding step to obtain display image data.

* * * * *